US007431503B2

(12) United States Patent
Naruse et al.

(10) Patent No.: US 7,431,503 B2
(45) Date of Patent: Oct. 7, 2008

(54) BEARING SUPPORT STRUCTURE FOR ACTUATOR

(75) Inventors: Tetsuya Naruse, Kashiwa (JP); Kazuhiro Iida, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 220 days.

(21) Appl. No.: 11/405,517

(22) Filed: Apr. 18, 2006

(65) Prior Publication Data
US 2006/0233475 A1    Oct. 19, 2006

(30) Foreign Application Priority Data
Apr. 19, 2005    (JP) .............................. 2005-121254

(51) Int. Cl.
*F16C 29/12*    (2006.01)
(52) U.S. Cl. .............................. 384/26; 384/39; 384/42
(58) Field of Classification Search .................. 384/26, 384/37, 38, 39, 40, 42
See application file for complete search history.

(56) References Cited

U.S. PATENT DOCUMENTS

| 4,856,415 | A | * | 8/1989 | Noda ........................... 384/42 |
| 6,036,366 | A | * | 3/2000 | Andreasson ................. 384/42 |
| 6,524,092 | B1 | * | 2/2003 | Ito et al. ....................... 384/39 |
| 6,880,974 | B2 |  | 4/2005 | Moshammer |

FOREIGN PATENT DOCUMENTS

JP    2004-522099    7/2004

* cited by examiner

*Primary Examiner*—Thomas R Hannon
(74) *Attorney, Agent, or Firm*—Paul A. Guss

(57) ABSTRACT

A slider is displaceable in an axial direction on guide sections of a cylinder tube. Bearings are installed with the slider, so that the bearings are opposed to the guide sections. Bearings are also installed on first and second bearing support members, which are provided respectively at retaining sections of the slider. When the slider is displaced in the axial direction along the cylinder tube, only one end surface of one of the flange sections of the bearing is pressed, depending on the displacement direction of the slider, in order to effect displacement in an integrated manner.

14 Claims, 15 Drawing Sheets

BEARING SUPPORT STRUCTURE FOR ACTUATOR

BACKGROUND OF THE INVENTION

1. Field of the Invention

The present invention relates to a bearing support structure for an actuator, for supporting a bearing arranged at a sliding portion between a main actuator body and an actuator displacement member.

2. Description of the Related Art

An actuator such as a rodless cylinder has been used as a means for transporting a workpiece. For example, the rodless cylinder includes a guide rail, which is formed in the axial direction of a cylinder body. A displacement member is provided, which is displaced with respect to the guide rail. A slide member, which functions as a bearing, is arranged between the displacement member and the guide rail. A projection, which protrudes toward the displacement member, is formed at one end of the slide member. The projection engages with an indented recess of the displacement member. In this structure, when the displacement member is displaced, the displacement member and the slide member are displaced together in an integrated manner in the axial direction. Accordingly, the slide member reduces sliding resistance between the displacement member and the guide rail (see, for example, Japanese Laid-Open Patent Publication No. 2004-522099 (PCT)).

In the case of the actuator described in Japanese Laid-Open Patent Publication No. 2004-522099 (PCT), when the displacement member is displaced along the guide rail, a displacement force of the displacement member is applied to the projection of the slide member, and the projection is pressed in the axial direction while the displacement member is displaced. Accordingly, the slide member and the displacement member are displaced in an integrated manner. However, when the displacement member is displaced, sliding resistance in a direction opposite to the displacement direction of the displacement member is generated between the guide rail and the sliding surface of the slide member, which abuts against the guide rail.

In particular, a displacement force which generates a compressive stress depending on the operating direction of the displacement member, and a displacement force which applies a tensile stress, exist between the projection of the slide member and the sliding surface. Therefore, an alternating load is applied between the projection and the sliding surface, and thus the durability of the slide member deteriorates due to the alternating load.

SUMMARY OF THE INVENTION

A general object of the present invention is to provide a bearing support structure for an actuator, which improves durability of the bearings provided between a main actuator body and a displacement member.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
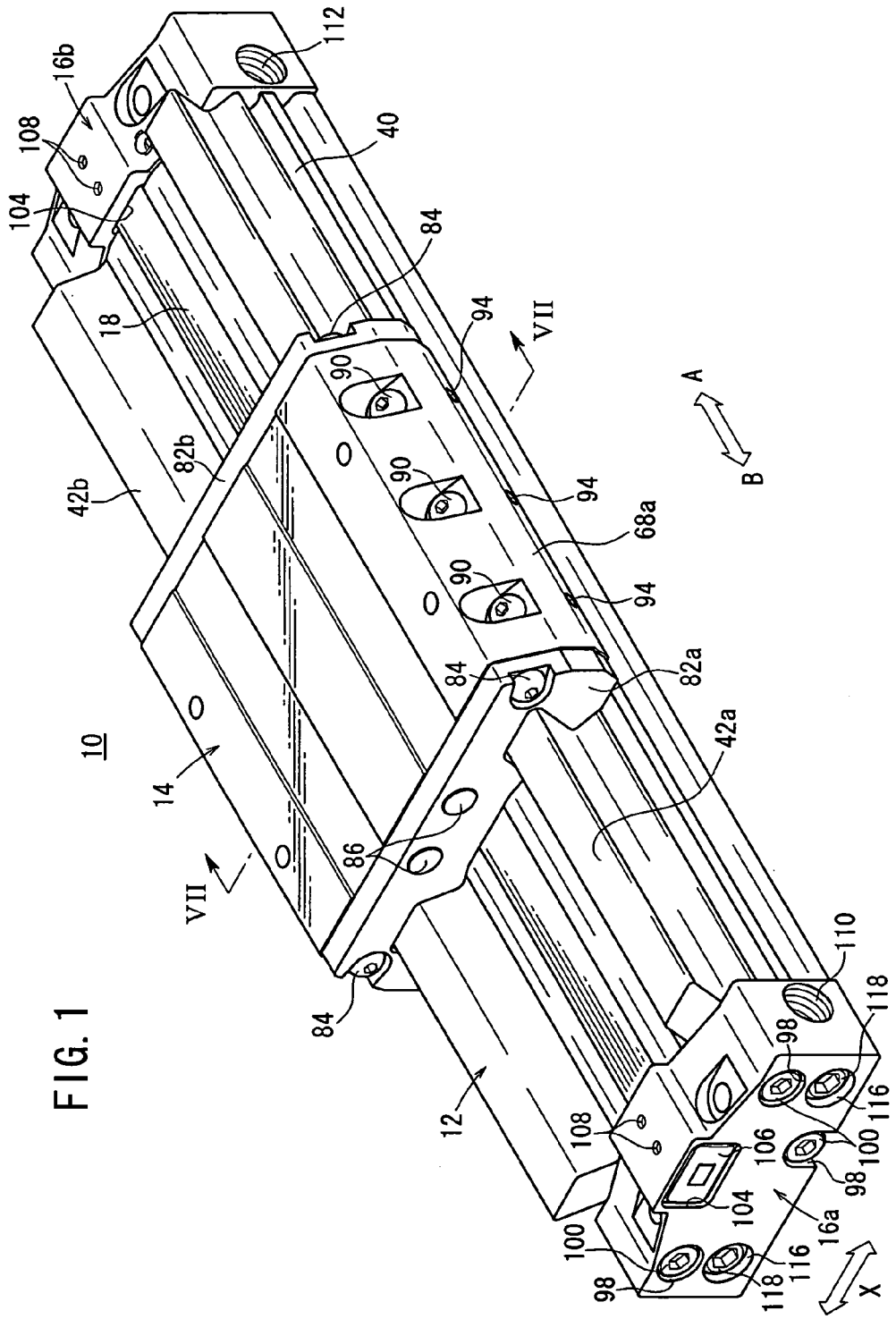
FIG. 1 is a perspective view illustrating a cylinder apparatus to which a bearing support structure according to a first embodiment of the present invention is applied.

With reference to FIG. 1, reference numeral 10 indicates a cylinder apparatus, as an example of an actuator to which a bearing support structure according to a first embodiment of the present invention is applied.

Figure 2:
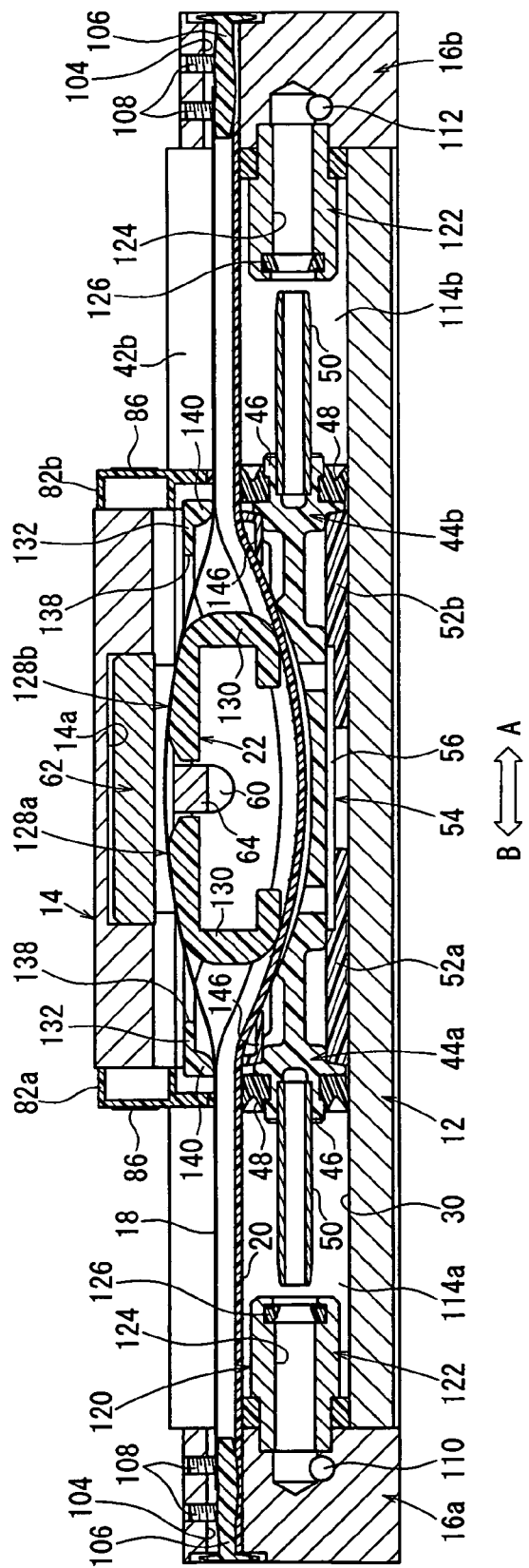
FIG. 2 is a longitudinal sectional view taken along the axial direction of the cylinder apparatus shown in FIG. 1.

As shown in FIGS. 1 and 2, the cylinder apparatus 10 comprises a cylinder tube (main actuator body) 12, which is lengthy in the axial direction, a slider (displacement member) 14, which is attached to the cylinder tube 12 and which is movable back and forth in the axial direction, and a pair of end blocks 16a, 16b, which are installed to respective ends of the cylinder tube 12.

The cylinder apparatus 10 further comprises a belt guide mechanism 22 (see FIG. 2), which guides an upper belt 18 and a lower belt 20 (see FIG. 7) that are installed in the cylinder tube 12, bearing-retaining sections 26, which retain a plurality of bearings 24a to 24d (see FIG. 7) provided between the slider 14 and the cylinder tube 12, and a guide mechanism 28 (see FIG. 7), which guides the slider 14 with respect to the cylinder tube 12.

Figure 3:
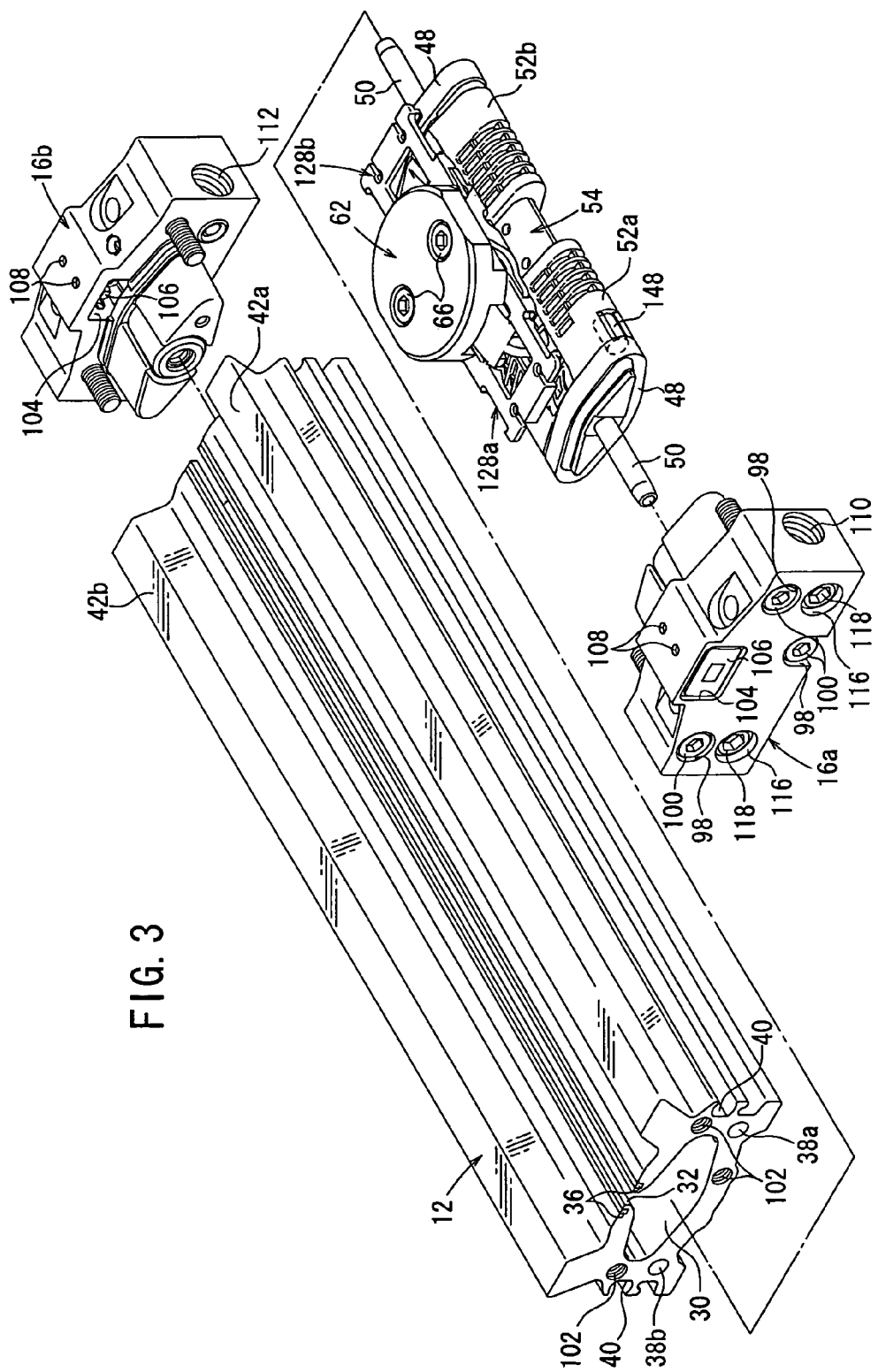
FIG. 3 is, with partial omission, an exploded perspective view illustrating the cylinder apparatus shown in FIG. 1.
Figure 7:
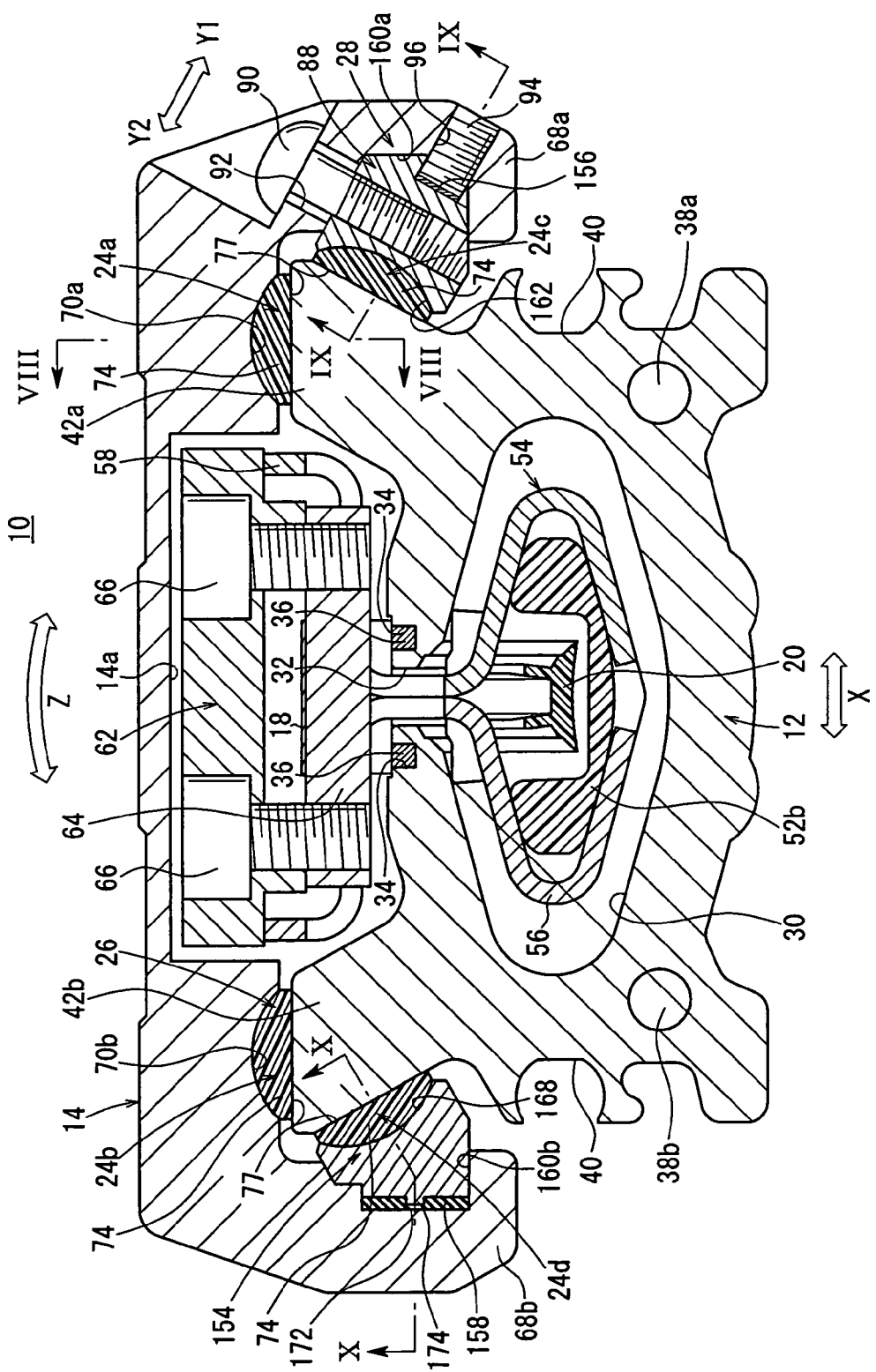
FIG. 7 is a vertical sectional view taken along line VII-VII shown in FIG. 1.

As shown in FIGS. 3 and 7, a bore section 30, which has a substantially lozenge-shaped cross section, is formed in the axial direction inside the cylinder tube 12. A slit 32, which is open in the axial direction, is formed on an upper surface of the cylinder tube 12. The bore section 30 communicates with the outside via the slit 32.

The upper belt 18 and the lower belt 20, which seal the slit 32 by closing the slit 32 in both of vertical upward and downward directions, are attached to the slit 32 of the cylinder tube 12. The upper belt 18 is formed of, for example, a metal material having a sheet-shaped form. The lower belt 20 is formed of, for example, a resin material.

Two magnetic members 36 (for example, permanent magnets) are installed in attachment grooves 34 and extend in the axial direction on both sides of the slit 32. The upper belt 18 is attracted by magnetic forces produced by the magnetic members 36, and the slit 32 is closed at the upper portion thereof. Accordingly, invasion of external dust or the like via the slit 32 into the interior of the cylinder tube 12 is prevented.

Both ends of the upper belt 18 and the lower belt 20 are fixed respectively to the pair of end blocks 16a, 16b that are connected respectively at both ends of the cylinder tube 12 (see FIG. 2).

Two bypass passages 38a, 38b, which extend in the axial direction, are formed in the vicinity of the bore section 30 of the cylinder tube 12. The bypass passages 38a, 38b are separated from the bore section 30 by predetermined distances. Concentrated piping (not shown), through which the pressure fluid flows, is connected to the bypass passages 38a, 38b.

On the other hand, a pair or plural pairs of sensor attachment grooves 40, which extend in the axial direction, are formed on both side surfaces of the cylinder tube 12. A position-detecting sensor (not shown) is installed in the sensor attachment groove 40, in order to detect the displacement position of the pistons 44a, 44b as described later on.

Two guide sections 42a, 42b, each of which protrudes upwardly by a predetermined height and which are separated from each other by a predetermined distance in the widthwise direction (direction of arrow X) perpendicular to the axis of the slit 32, are formed on the upper surface of the cylinder tube 12. The guide sections 42a, 42b extend in the axial direction of the cylinder tube 12. The slider 14 engages with the guide sections 42a, 42b for displacement in the axial direction by means of the guide mechanism 28.

The guide sections 42a, 42b are formed so as to be inclined by a predetermined angle in the widthwise direction (direction of arrow X) while being separated from the slit 32 of the cylinder tube 12. The guide sections 42a, 42b are formed so that upper surfaces of the guide sections 42a, 42b are substantially horizontal. Therefore, the guide sections 42a, 42b have substantially identical heights. In other words, the guide sections 42a, 42b are formed to have substantially symmetrical shapes in the widthwise direction (direction of arrow X) of the cylinder tube 12 about the center of the slit 32.

Figure 4:
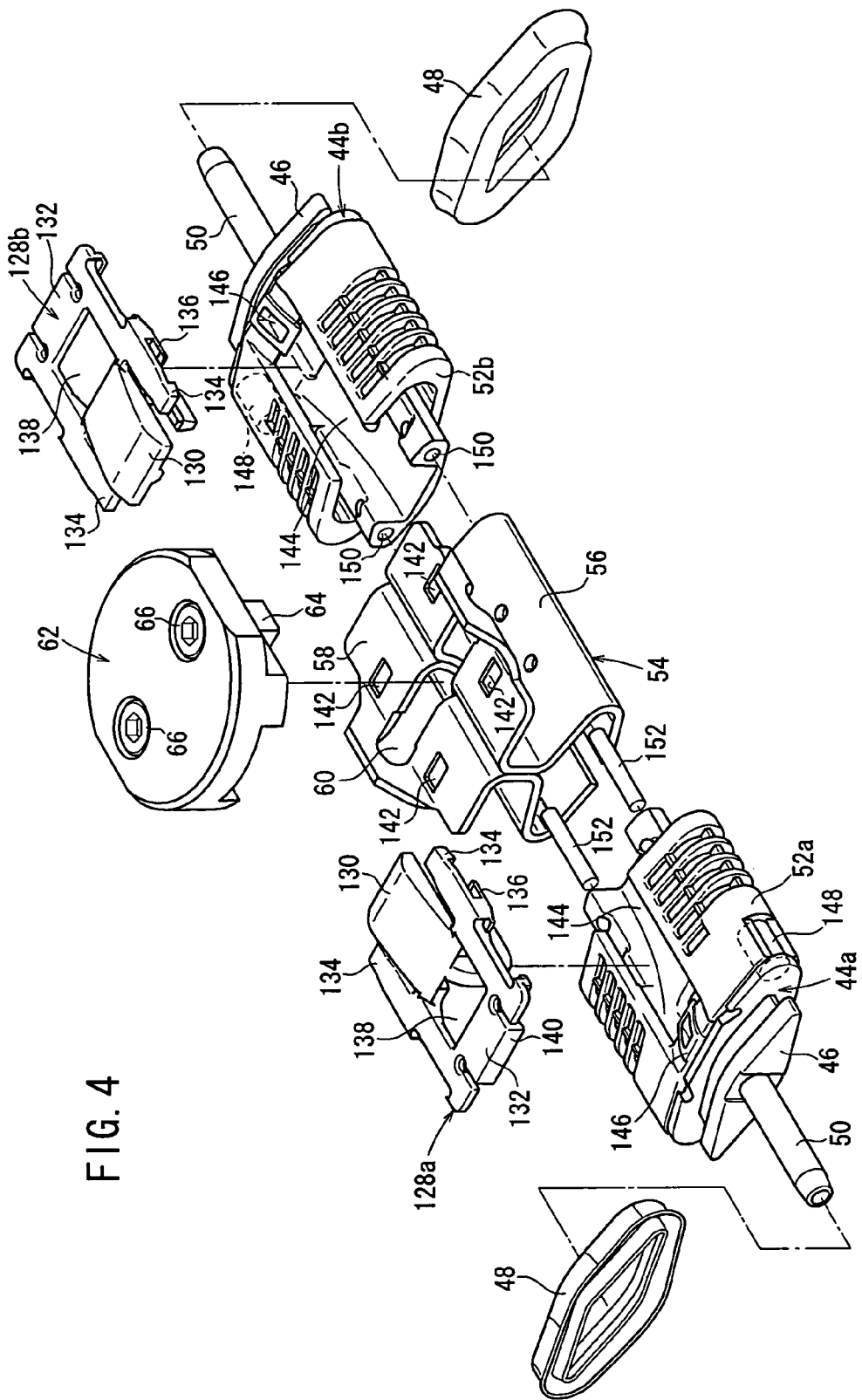
FIG. 4 is an exploded perspective view illustrating a belt guide mechanism of the cylinder apparatus shown in FIG. 1.

As shown in FIG. 2, two pistons 44a, 44b, which are complementary in shape to the cross-sectional shape of the bore section 30, are inserted movably back and forth within the bore section 30 of the cylinder tube 12. As shown in FIGS. 3 and 4, a projection 46 is formed at one end of each of the pistons 44a, 44b. An annular seal member 48 is installed on the circumferential edge of the projection 46. Accordingly, when the pistons 44a, 44b are inserted into the bore section 30 of the cylinder tube 12, spaces between the pistons 44a, 44b and the inner wall surface of the bore section 30 are sealed by the seal members 48 and air-tightness is retained within the bore section 30.

As shown in FIG. 4, shaft sections 50, which protrude toward the end blocks 16a, 16b, are provided on the projections 46 of the pistons 44a, 44b.

A piston yoke 54 is interposed between one piston 44a and the other piston 44b through wear rings 52a, 52b. The piston yoke 54 is integrally connected to the pistons 44a, 44b. The piston yoke 54 includes an insertion section 56, which has a substantially lozenge-shaped cross section corresponding to the cross-sectional shape of the bore section 30, and a yoke section 58, which has a substantially T-shaped form disposed above the insertion section 56.

As shown in FIG. 7, the piston yoke 54 is installed in the following manner. The insertion section 56 is inserted into the bore section 30 in the same manner as the pistons 44a, 44b. A connecting portion between the insertion section 56 and the yoke section 58 is inserted into the slit 32 so that the yoke section 58 is disposed on the upper side of the cylinder tube 12. The width of the yoke section 58 is expanded to have a predetermined width in the widthwise direction (direction of arrow X) of the cylinder tube 12. The slider 14 is installed onto the yoke section 58.

As shown in FIG. 4, an engaging groove 60, which extends in the widthwise direction (direction of arrow X), is formed at a substantially central portion of the yoke section 58. A substantially disk-shaped coupler 62 is installed in a rectangular engaging groove 60 by means of an engaging member 64 installed on the lower surface thereof.

The engaging member 64 is installed on the lower surface of the coupler 62 by two bolts 66, so that the engaging member 64 is substantially perpendicular to the axis of the cylinder tube 12. It is not essential that the engaging member 64 be provided as a separate member distinct from the coupler 62. The engaging member 64 may also be provided integrally on a lower portion of the coupler 62.

Figure 6:
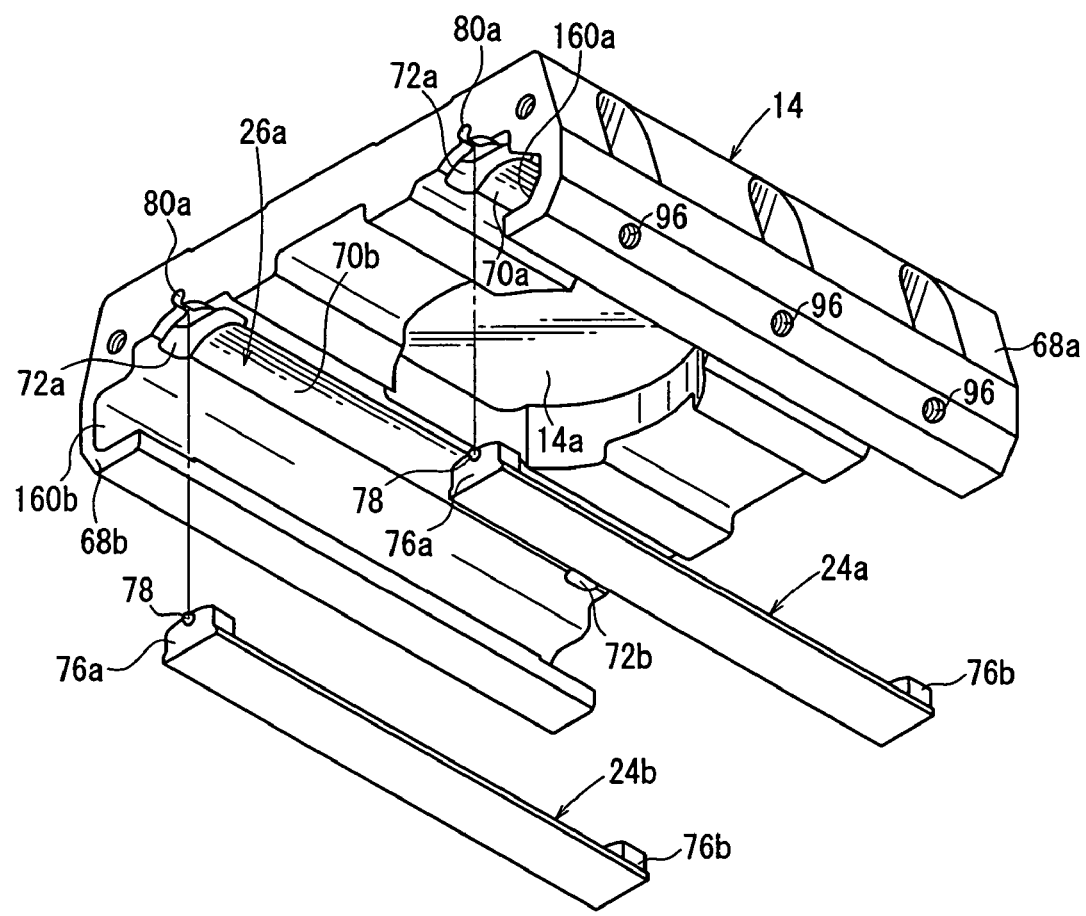
FIG. 6 is an exploded perspective view illustrating a slider of the cylinder apparatus shown in FIG. 1 as viewed from a lower position.

As shown in FIG. 6, the slider 14 has a substantially U-shaped cross section. A coupler-inserting hole 14a is formed on a lower surface side, opposed to the cylinder tube 12. The coupler 62, which is installed on the piston yoke 54, is inserted into the coupler-inserting hole 14a. The shape of the coupler-inserting hole 14a is slightly larger than that of the coupler 62 in the radial direction. Accordingly, the slider 14 is integrally installed on the upper portion of the coupler 62.

In this arrangement, as shown in FIG. 7, the slider 14 includes a pair of retaining sections 68a, 68b, which protrude in a vertical downward direction, and which are formed on both sides of the slider 14 in the widthwise direction (direction of arrow X). The retaining sections 68a, 68b engage with the guide sections 42a, 42b of the cylinder tube 12 through the guide mechanism 28 provided therein.

As described above, the slider 14 is integrally installed with the pistons 44a, 44b through the aid of the coupler 62 and the piston yoke 54. Therefore, the slider 14 is displaceable in the axial direction while being guided by the guide sections 42a, 42b when the pistons 44a, 44b are displaced in the axial direction.

As shown in FIGS. 5 to 8, retaining grooves (first retaining sections) 70a, 70b, which are capable of retaining the pair of bearings 24a, 24b, are formed on the lower surface of the slider 14 at positions opposed to upper surfaces of the guide sections 42a, 42b of the cylinder tube 12. The retaining grooves 70a, 70b extend in the axial direction of the slider 14 (the direction of arrows A, B). The retaining grooves 70a, 70b are formed as recesses, wherein the cross sections thereof are substantially circularly arc-shaped toward the upper surface of the slider 14. Two deep grooves 72a, 72b (see FIG. 6), which are recessed and deeper than the retaining grooves 70a, 70b, are formed at both ends of the retaining grooves 70a, 70b in the axial direction of the slider 14. The retaining grooves 70a, 70b and the deep grooves 72a, 72b function as bearing support sections 26, for retaining the bearings 24a, 24b with respect to the slider 14.

Figure 5:
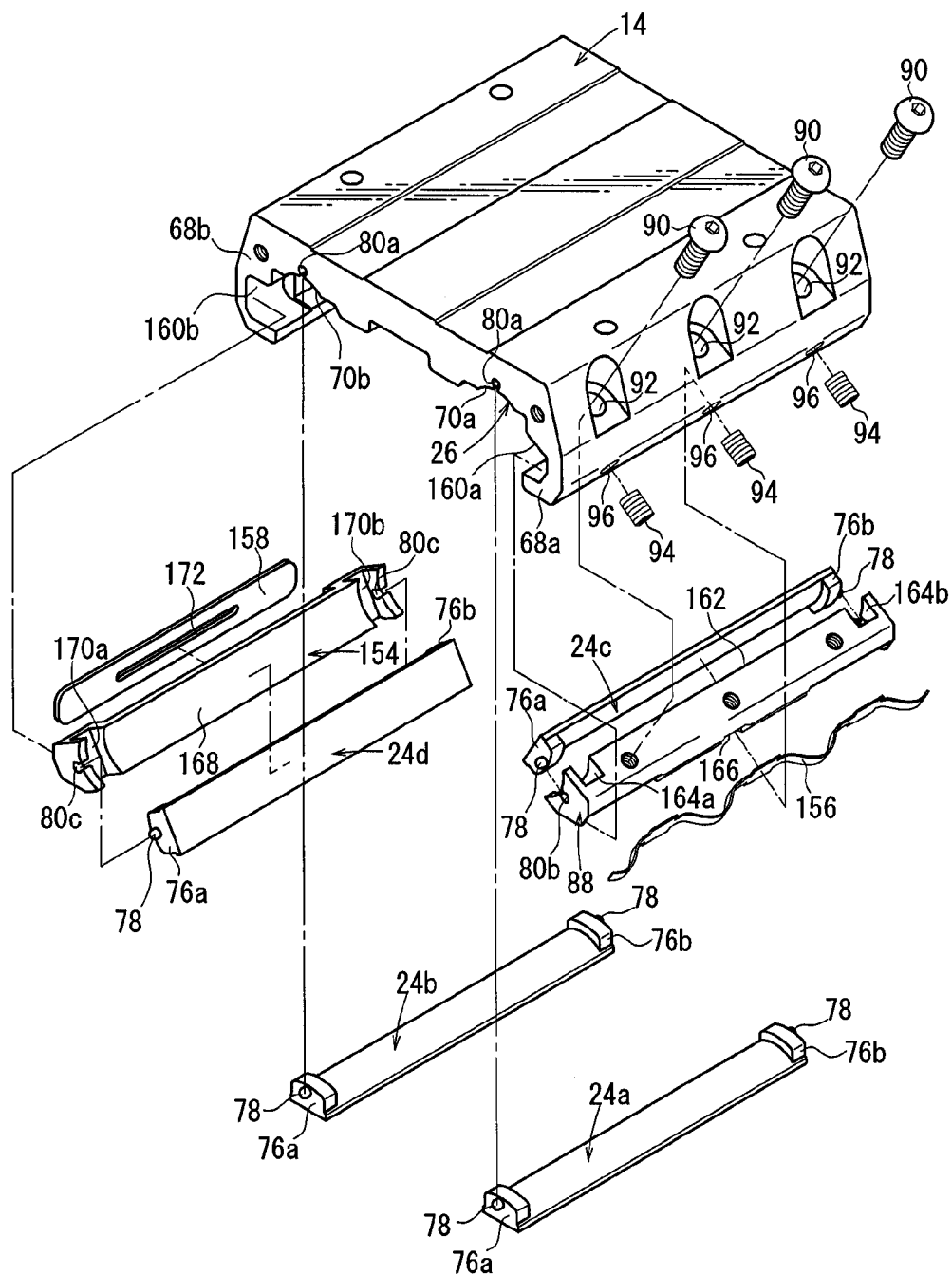
FIG. 5 is an exploded perspective view illustrating a guide mechanism of the cylinder apparatus shown in FIG. 1.

On the other hand, as shown in FIG. 5, each of the bearings 24a, 24b comprises a main body section 74, which extends in the axial direction and is formed of a resin material, and a pair of flange sections (engaging projections) 76a, 76b which protrude a predetermined height upwardly at both ends of the main body section 74.

The main body section 74 is formed and expanded with a substantially circular arc-shaped cross section, so that a portion on the upper surface side thereof, on which the flange sections 76a, 76b are formed, conforms to the inner wall surface of the retaining grooves 70a, 70b. Further, the flange sections 76a, 76b protrude in such a way that the flange sections 76a, 76b conform to the pair of deep grooves 72a, 72b formed within the retaining grooves 70a, 70b. A portion of the bearings 24a, 24b, which is disposed on the lower surface side thereof opposed to the guide section 42a, 42b, is substantially planar.

The cross-sectional shape of the main body section 74 is not restricted to an arrangement in which the cross-sectional shape thereof has a substantially circular arc-shaped form. The cross-sectional shape of the main body section 74 may also be substantially rectangular.

Figure 8:
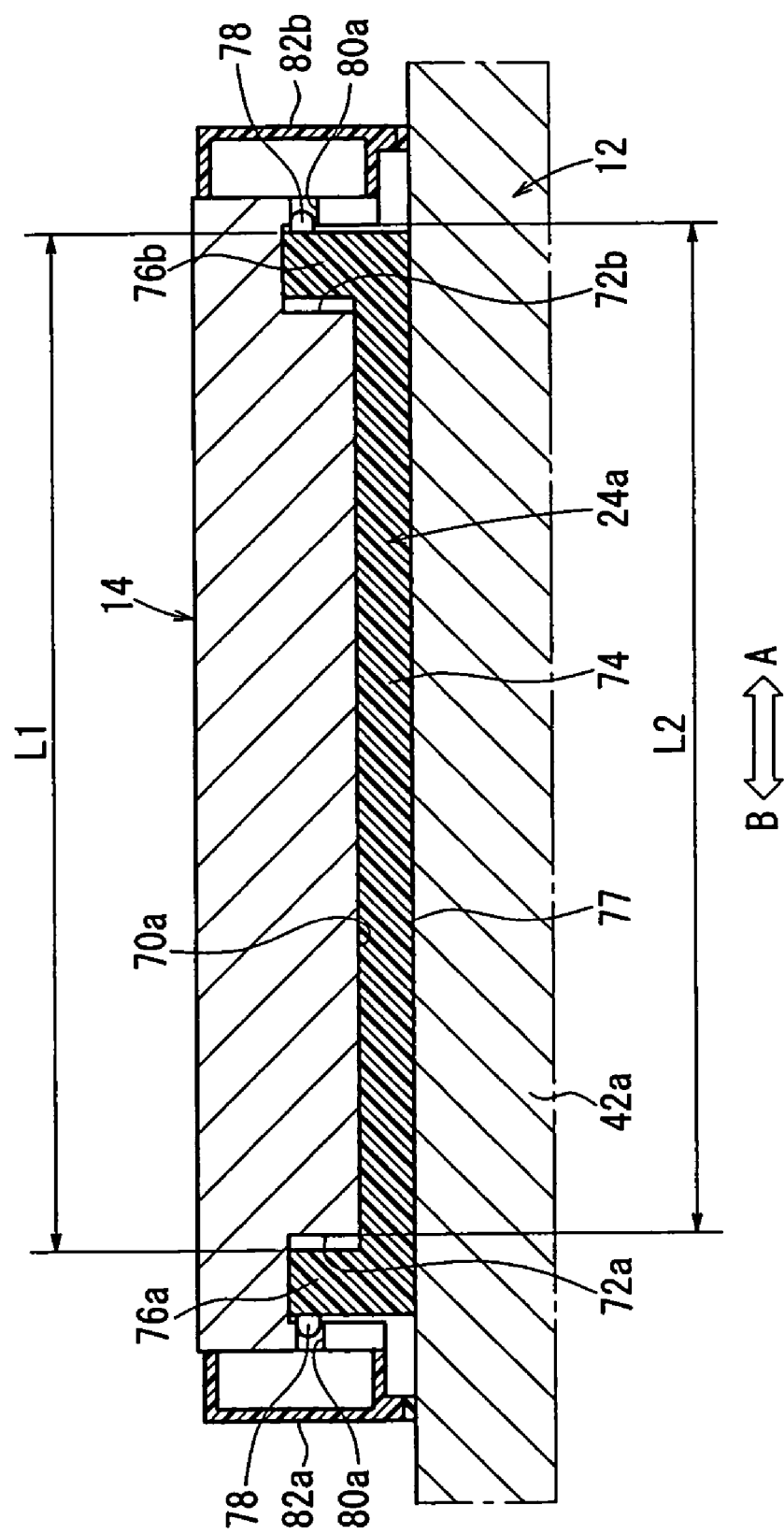
FIG. 8 is a vertical sectional view taken along line VIII-VIII shown in FIG. 7.

As for the bearings 24a, 24b, as shown in FIG. 8, the distance L1 between the inner wall surface of one flange section 76a and the outer wall surface of the other flange section 76b is larger than the distance L2 between the inner wall surface of one deep groove 72a and the outer wall surface of the other deep groove 72b disposed on the side of the cover member 82b (L1>L2). Therefore, the bearings 24a, 24b are displaceable a slight amount in the axial direction (direction of arrows A, B) within the retaining grooves 70a, 70b.

As a result, when the flange sections 76a, 76b of the bearings 24a, 24b abut against the slider 14 upon displacement of the slider 14, outer wall surfaces of the flange sections 76a, 76b abut against the outer wall surfaces of the deep grooves 72a, 72b.

The main body sections 74 of the bearings 24a, 24b are installed in the retaining grooves 70a, 70b of the slider 14, and the flange sections 76a, 76b engage within the deep grooves 72a, 72b respectively. In this state, the pair of bearings 24a, 24b is interposed between the lower surface of the slider 14 and upper surfaces of the guide sections 42a, 42b of the cylinder tube 12. Therefore, the slider 14 can be displaced smoothly by means of the sliding surfaces 77 of the bearings 24a, 24b, which are supported between the slider 14 and the guide sections 42a, 42b.

On the other hand, projections 78, which protrude respectively toward the end blocks 16a, 16b, are formed on end surfaces of the flange sections 76a, 76b. When the flange sections 76a, 76b engage with the deep grooves 72a, 72b, the projections 78 engage within recesses 80a, which are formed on inner wall surfaces of the deep grooves 72a, 72b. Accordingly, the bearings 24a, 24b, which are installed in the retaining grooves 70a, 70b, are prevented from becoming disengaged from the retaining grooves 70a, 70b. Even when the bearings 24a, 24b are displaced in the axial direction with respect to the retaining grooves 70a, 70b, the projections 78 of the bearings 24a, 24b and the recesses 80a of the slider 14 remain engaged with each other.

Two cover members 82a, 82b are installed on both end surfaces of the slider 14 in the axial direction by bolts 84, so that both end surfaces are covered therewith respectively. Fastening members 86 are provided at substantially central portions of the cover members 82a, 82b (see FIG. 1). The fastening members 86 protrude slightly from the end surfaces of the cover members 82a, 82b toward the end blocks 16a, 16b (see FIG. 2). For example, when an unillustrated stopper mechanism is provided on the cylinder tube 12, the slider 14 abuts against the stopper mechanism through the fastening members 86, and thus the slider 14 is fastened thereby.

When the cover members 82a, 82b are formed of flexible elastic members (for example, rubber), the cover members 82a, 82b can be flexibly bent in order to install them onto the end surfaces of the slider 14, after the slider 14 has been installed on the cylinder tube 12. In other words, when the slider 14 is assembled with the cylinder tube 12, it is unnecessary for the cover members 82a, 82b to be installed beforehand on the slider 14. Therefore, the cover members 82a, 82b can be assembled with greater facility.

Dust-removing members (not shown) may be integrally formed on lower surfaces of the cover members 82a, 82b, so that the dust-removing members are opposed to the upper surface of the cylinder tube 12. Accordingly, invasion of dust or the like into the slider 14 through gaps between the cylinder tube 12 and the cover members 82a, 82b can be avoided.

Further, lubricating members (for example, porous members), which contain a lubricant therein, may be provided within portions of the cover members 82a, 82b that are opposed to the end surfaces of the slider 14. The lubricating members may be used to continuously lubricate the guide sections 42a, 42b of the cylinder tube 12 over which the bearings 24a to 24d are slidably displaced. Accordingly, sliding resistance is reduced when the bearings 24a to 24d are displaced. Therefore, the slider 14 can be displaced more smoothly with respect to the cylinder tube 12.

As shown in FIGS. 1 and 5, the slider 14 has a plurality of (for example, three) through-holes 92, which are formed in one retaining section 68a. Fixing bolts 90 are inserted into the through-holes 92 in order to fix thereto a first bearing support member 88 of the guide mechanism 28 (as described later on). The through-holes 92 are separated from each other by predetermined distances in the axial direction of the slider 14. Further, the through-holes 92 are inclined at a predetermined angle, so that the through-holes 92 are substantially in parallel with the side surface of the guide section 42a when the slider 14 is installed on the cylinder tube 12.

Portions thereof, which are disposed in the vicinity of the through-holes 92, are recessed at a predetermined depth from the side surface of the slider 14. Therefore, when the fixing bolts 90 are inserted into the through-holes 92 in order to fix the first bearing support member 88 of the guide mechanism 28, the fixing bolts 90 do not protrude from the side surface of the slider 14.

As shown in FIG. 7, the retaining section 68a has a plurality of screw holes 96 with plugs 94 threaded therein, which are disposed at positions below the portions where the through-holes 92 are formed. The screw holes 96 extend at angles substantially perpendicular to the side surface of the guide section 42a of the cylinder tube 12 when the slider 14 is installed on the cylinder tube 12.

As shown in FIGS. 1 to 3, the end blocks 16a, 16b are provided at both ends of the cylinder tube 12 respectively, so that the openings of the bore section 30 are closed thereby. Screw members 100, which are installed in screw-installing holes 98 of the end blocks 16a, 16b, are threaded into screw holes 102 of the cylinder tube 12. Accordingly, the end blocks 16a, 16b are integrally assembled to the cylinder tube 12.

As shown in FIG. 2, the end blocks 16a, 16b have holes 104 therein, which are formed at upper portions for insertion of the upper belt 18 and the lower belt 20. The ends of the upper belt 18 and the lower belt 20 are fixed by two pairs of fixing screws 108, and by means of fixing members 106, which are inserted into the holes 104 respectively.

As shown in FIGS. 1 and 3, a first port 110 and a second port 112, which are connected to a pressure fluid supply source via an unillustrated directional control valve, are formed respectively on side surfaces of the end blocks 16a, 16b. A pressure fluid (for example, compressed air) is selectively supplied from the pressure fluid supply source to the first and second ports 110, 112. The first and second ports 110, 112 communicate respectively with cylinder chambers 114a, 114b (see FIG. 2) in the cylinder tube 12 via unillustrated passages disposed in the end blocks 16a, 16b or via bypass passages 38a, 38b provided in the cylinder tube 12. Cylinder chambers 114a, 114b are defined by the bore section 30, the end blocks 16a, 16b, and the pistons 44a, 44b respectively.

As shown in FIG. 1, outer ports 116 are formed on end surfaces of the end blocks 16a, 16b. The outer ports 116 communicate with the cylinder chambers 114a, 114b in the cylinder tube 12 via unillustrated passages disposed in the end blocks 16a, 16b or via bypass passages 38a, 38b provided in the cylinder tube 12. Threaded sealing screws 118 seal the outer ports 116.

As shown in FIG. 2, each of the end blocks 16a, 16b includes a decelerating mechanism 120, which is disposed on an inner wall surface side thereof, opposed to the cylinder tube 12, in order to decelerate the displacement speed of the pistons 44a, 44b.

The decelerating mechanism 120 includes a cylindrical member 122, which is installed in the end blocks 16a, 16b opposed to the pistons 44a, 44b. Insertion holes 124 are formed in the axial direction in the cylindrical member 122. An annular check packing 126 is installed in an annular groove on the inner circumferential surface of the insertion hole 124. Shaft sections 50 connected to the pistons 44a, 44b are inserted into the insertion holes 124 when the pistons 44a, 44b are displaced in the axial direction. In this situation, the check packing 126 abuts and surrounds the outer circumferential surface of the shaft section 50, in order to block the flow passage from the cylinder chamber 114a, 114b to the insertion hole 124.

Accordingly, fluid contained in the cylinder chambers 114a, 114b is discharged at a minute flow rate into first and second ports 110, 112 via an unillustrated narrow bypass passage defining a minute flow passage thereof. Therefore, displacement resistance is brought about when the pistons 44a, 44b are displaced. Accordingly, the displacement speed of the pistons 44a, 44b can be gradually decelerated. That is, the decelerating mechanism 120 performs a speed control function, in order to gradually decelerate the speed of the pistons 44a, 44b as the pistons 44a, 44b approach the end blocks 16a, 16b.

As shown in FIGS. 2 to 4, the belt guide mechanism 22 includes a pair of guide members 128a, 128b, which are provided at upper portions of the pistons 44a, 44b, and wear rings 52a, 52b, which are connected respectively to the pistons 44a, 44b. Each of the guide members 128a, 128b and the wear rings 52a, 52b is formed of, for example, a resin material. As shown in FIG. 4, each of the guide members 128a, 128b is composed of a belt separator section 130, which has a substantially C-shaped cross section, a belt-holding section 132, which protrudes from a substantially central portion of the belt separator section 130 toward one end, and first pawls 134 and second pawls 136, which protrude on sides of the belt separator section 130 and the belt-holding section 132.

A substantially rectangular belt insertion hole 138, into which the upper belt 18 is inserted, is formed between the belt separator section 130 and the belt-holding section 132. As shown in FIG. 2, the belt separator section 130, which has a substantially C-shaped cross section, is formed with a curved shape so that sliding resistance of the upper belt 18 and the lower belt 20 does not increase excessively.

As shown in FIG. 2, the belt separator section 130 is interposed between the upper belt 18 and the lower belt 20, which are curved and separated vertically from each other. The upper belt 18 is guided along a space formed between the belt separator section 130 and the slider 14. The lower belt 20 is guided along a space formed between the belt separator section 130 and the pistons 44a, 44b.

The belt-holding section 132 includes a projection 140, which protrudes a predetermined length downwardly. The upper belt 18 is pressed toward the cylinder tube 12 by the projection 140, and thus the upper belt 18 and the lower belt 20 approach one another (see FIG. 2).

As shown in FIG. 4, the first pawls 134, which protrude downwardly a predetermined length, are formed as a pair on both sides of the belt separator section 130. The first pawls 134 are installed respectively into grooves 142 formed in the yoke section 58 of the piston yoke 54. The second pawls 136 are installed on a lower surface of the yoke section 58. Accordingly, the piston yoke 54 and the guide members 128a, 128b are firmly and integrally connected to each other. More specifically, when the slider 14 moves, the belt separator section 130 functions to separate the upper belt 18 and the lower belt 20 from each other, and the belt-holding section 132 functions to cause the upper belt 18 and the lower belt 20 to approach one another.

As shown in FIG. 4, the wear rings 52a, 52b are formed with a cross-sectional shape corresponding to the bore section 30. A substantially rectangular cutout 144 is formed substantially centrally on the upper surface thereof. A substantially rectangular lower belt guide section 146, which guides the lower belt 20, is formed on one end side of the cutout 144. The lower belt guide section 146 has one end, which is formed at a position in the height direction substantially equivalent to the outer circumferential surface of the wear rings 52a, 52b, and another end, which is curved slightly in the downward direction.

The lower belt guide section 146 has a curved shape, so that sliding resistance does not increase excessively when the lower belt 20 is guided thereby (see FIG. 2).

A magnet 148 is installed on a hole formed at one end of the wear rings 52a, 52b. A magnetic field from the magnet 148 is detected by a sensor (not shown), which is installed in the sensor attachment groove 40 of the cylinder tube 12 (see FIG. 1). Accordingly, the position of the pistons 44a, 44b can be detected. Pin members 152 are forcibly inserted into pin holes 150 of the pistons 44a, 44b respectively, and thus the two pistons 44a, 44b are mutually connected to the piston yoke 54 through the wear rings 52a, 52b.

As shown in FIGS. 5 to 8, the guide mechanism 28 is disposed in opposition to the guide sections 42a, 42b, proximate to the retaining sections 68a, 68b of the slider 14. The guide mechanism 28 includes a first bearing support member 88, which is disposed in one retaining section 68a, and a second bearing support member 154, which is disposed in the other retaining section 68b. The first bearing support member 88 is disposed in opposition to the side surface of the guide section 42a, and the second bearing support member 154 is disposed in opposition to the guide section 42b.

The guide mechanism 28 includes a first elastic member 156, which is interposed between the first bearing support member 88 and the retaining section 68a, and a second elastic member 158, which is interposed between the second bearing support member 154 and the retaining section 68b.

The first bearing support member 88 is installed in an installation groove 160a formed on the inner wall surface of one retaining section 68a, which is fixed to the slider 14 by a plurality of fixing bolts 90 inserted into through-holes 92 formed in the retaining section 68a.

The first bearing support member 88 may be formed of a metal material such as aluminum. The first bearing support member 88 makes abutment in such a manner that the first bearing support member 88 is substantially perpendicular to the side surface of one guide section 42a. The fixing bolts 90 are threaded with the first bearing support member 88, so that the fixing bolts 90 are substantially parallel to the side surface of the guide section 42a.

As shown in FIG. 7, the first bearing support member 88 has a retaining groove (second retaining groove) 162 therein, which is formed on a side surface opposed to the guide section 42a of the cylinder tube 12, in order to retain the bearing 24c. The retaining groove 162 is formed in the axial direction, wherein the shape thereof is substantially the same as the shape of the retaining grooves 70a, 70b formed on the lower surface of the slider 14. The retaining groove 162 is recessed and has a substantially circular arc-shaped cross section facing toward the retaining section 68a of the slider 14.

The retaining groove 162 is arranged on a circle having the same diameter and center as an identical circle on which one retaining groove 70a of the slider 14 is arranged. In particular, the retaining groove 70a and the retaining groove 162 are recessed with substantially circular arc-shaped cross sections having substantially the same radius. The centers of the arc-shaped cross sections also are substantially at the same point.

As shown in FIG. 5, a pair of deep grooves 164a, 164b, which are more deeply recessed as compared with the retaining groove 162, are formed at both ends of the first bearing support member 88. When the bearing 24c is installed in the retaining groove 162, the flange sections 76a, 76b of the bearing 24c engage with the deep grooves 164a, 164b (see FIG. 9). The retaining groove 162 and the deep grooves 164a, 164b function as a bearing-retaining section 26, which retains the bearing 24c with respect to the slider 14. The detailed shape of the bearing 24c is the same as that of the bearings 24a, 24b that are installed on the lower surface of the slider 14. Therefore, detailed explanation of the bearing 24c shall be omitted.

As described above, the bearing 24c is interposed between the first bearing support member 88 and the guide section 42a. Therefore, when the slider 14 is displaced along the guide section 42a, the slider 14 can be smoothly displaced due to the sliding surface 77 of the bearing 24c.

Figure 9:
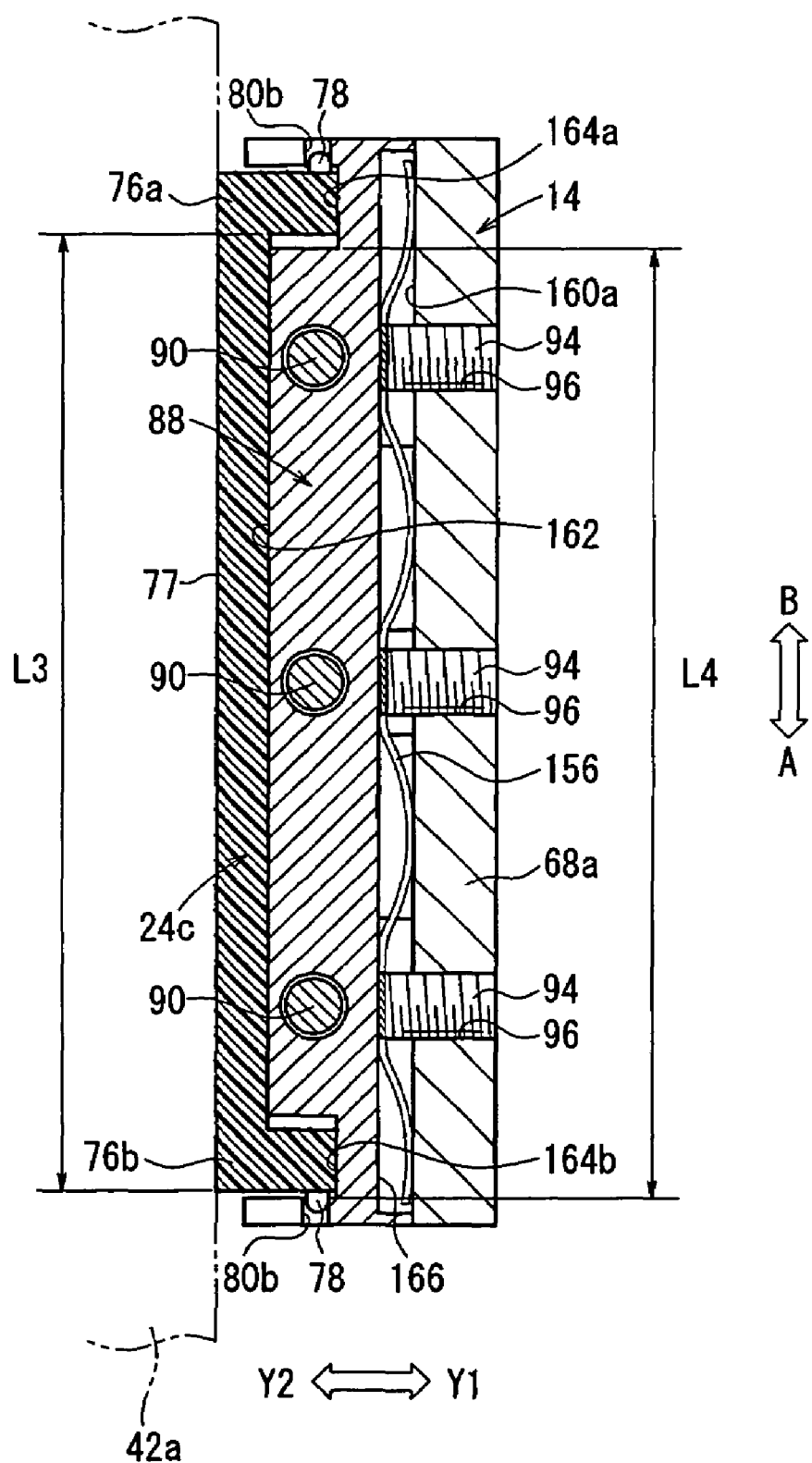
FIG. 9 is a vertical sectional view taken along line IX-IX shown in FIG. 7.

Further, as shown in FIG. 9, the distance L3 of the bearing 24c, between the inner wall surface of one flange section 76a and the outer wall surface of the other flange section 76b, is larger than the distance L4 between the inner wall surface of one deep groove 164a and the outer wall surface of the other deep groove 164b (L3>L4). Therefore, the bearing 24c can be displaced by a slight amount in the axial direction (direction of arrows A, B) within the retaining groove 162. As a result, when the flange sections 76a, 76b of the bearing 24c abut against the slider 14 as the slider 14 is displaced, the outer wall surfaces of the flange sections 76a, 76b abut against the outer wall surfaces of the deep grooves 164a, 164b.

Projections 78, which protrude respectively toward the end blocks 16a, 16b, are formed at the end surfaces of the flange sections 76a, 76b. When the flange sections 76a, 76b engage within the deep grooves 164a, 164b, the projections 78 engage with recesses 80b formed at the end surfaces of the first bearing support member 88. Therefore, the bearing 24c, which is installed in the retaining groove 162, can be prevented from disengaging from the first bearing support member 88.

On the other hand, as shown in FIGS. 5 and 9, the first bearing support member 88 includes an installation hole 166, which faces the screw holes 96 into which the fixing bolts 90 are threaded, and which is formed on the side surface in abutment against the retaining section 68a of the slider 14. The first elastic member 156 is installed in the installation hole 166.

The first elastic member 156 is composed of, for example, a spring such as a plate spring, which is bent at a plurality of positions in a wavy form. As shown in FIG. 9, the first elastic member 156 is disposed such that a plurality of (for example, three) portions, which are convex toward the first bearing support member 88, abut against the inner wall surface of the installation hole 166, and a plurality of (for example, four) portions, which are concave, abut against the inner wall surface of the installation groove 160a of the slider 14.

In particular, the resilient force of the first elastic member 156 urges the first bearing support member 88 and the retaining section 68a of the slider 14 in directions to separate away from each other (see the direction of arrow Y1 shown in FIGS. 7 and 9).

Further, portions of the first elastic member 156 that abut against the inner wall surface of the installation hole 166 are pressed by a plurality of (for example, three) plugs 94, which are threaded within the retaining section 68a of the slider 14. The plugs 94 are screw-engaged with the screw holes 96 so that the plugs 94 are substantially perpendicular to the through-hole 92 of the slider 14. Therefore, the first elastic member 156 is held in position while being pressed toward the first bearing support member 88 (in the direction of arrow Y2) owing to the threaded engagement of the plugs 94.

Figure 10:
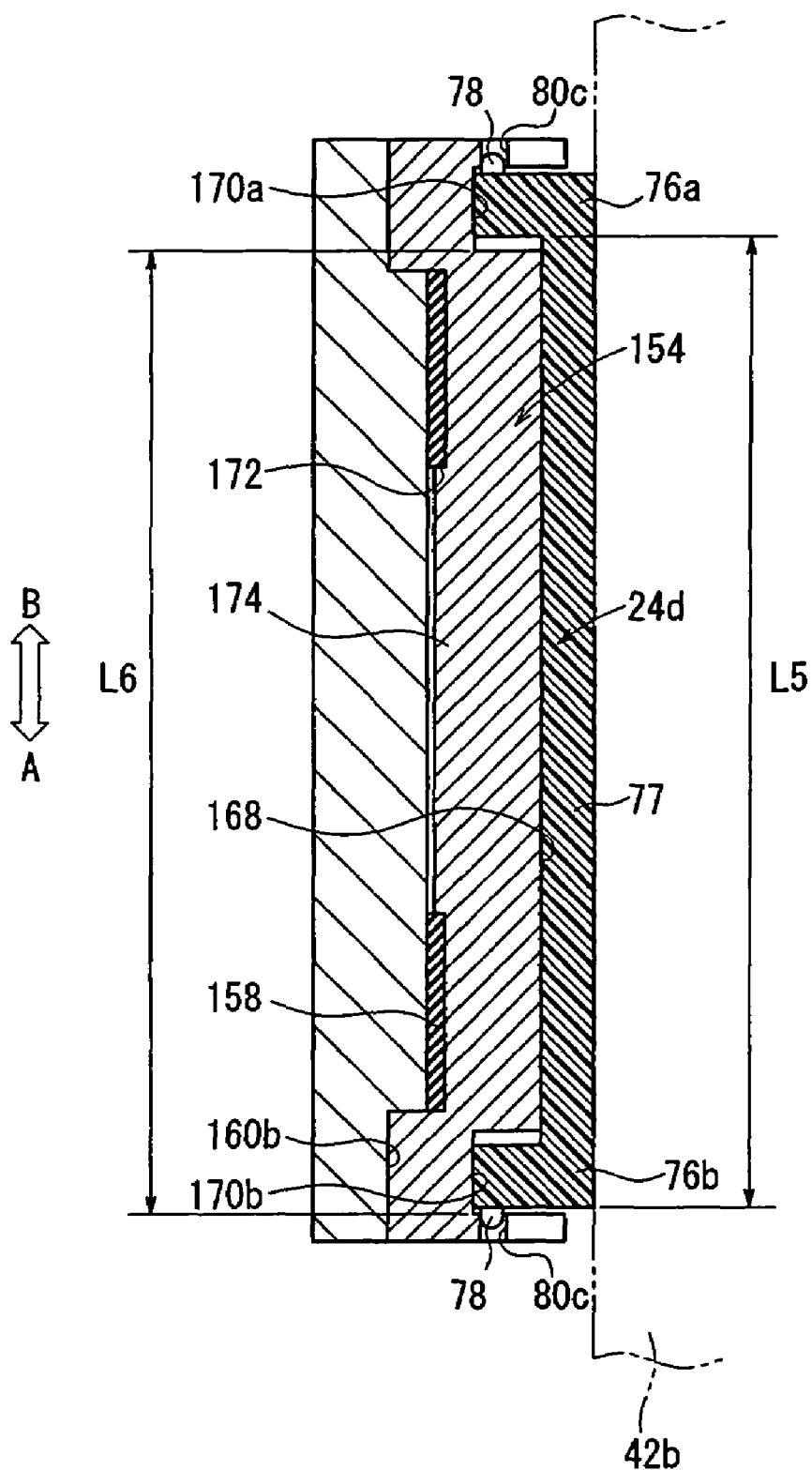
FIG. 10 is a vertical sectional view taken along line X-X shown in FIG. 7.

As shown in FIGS. 7 and 10, the second bearing support member 154 is formed of, for example, a metal material such as aluminum. The second bearing support member 154 is installed in an installation groove 160b formed on the inner wall surface of the other retaining section 68b. A portion of the second bearing support member 154 that is installed in the installation groove 160b is substantially horizontal. Further, a portion thereof disposed on the side of the other guide section 42b abuts substantially perpendicularly against the side surface of the guide section 42b. That is, the second bearing support member 154 is interposed between the guide section 42b and the retaining section 68b of the slider 14.

A retaining groove (second retaining section) 168, in which the bearing 24d is retained, is formed on the side surface of the second bearing support member 154 opposed to the guide section 42b. The retaining groove 168 extends in the axial direction and has substantially the same shape as that of the retaining grooves 70a, 70b formed on the lower surface of the slider 14. The retaining groove 168 is recessed with a substantially circular arc-shaped cross section toward the retaining section 68b of the slider 14.

The retaining groove 168 is arranged on a circle having the same diameter and center as that of an identical circle on which one retaining groove 70b formed on the slider 14 is arranged. In particular, the retaining groove 70b and the retaining groove 168 are recessed and have substantially circular arc-shaped cross sections of substantially the same radius. The centers of the arc-shaped cross sections also are substantially at the same point.

A pair of deep grooves 170a, 170b, which are recessed more deeply toward the retaining section 68b than the retaining groove 168, are formed at both ends of the second bearing support member 154. When the bearing 24d is installed in the retaining groove 168, the flange sections 76a, 76b of the bearing 24d engage within the deep grooves 170a, 170b. The retaining groove 168 and the deep grooves 170a, 170b function as a bearing-retaining section 26, for retaining the bearing 24d with respect to the slider 14. The detailed shape of the bearing 24d is the same as that of the bearings 24a, 24b that are installed on the lower surface of the slider 14. Therefore, detailed explanation of the shape of the bearing 24d shall be omitted.

Accordingly, as shown in FIG. 7, the bearing 24d is interposed so that the bearing 24d abuts substantially perpendicularly against the guide section 42b by means of the second bearing support member 154. Therefore, the slider 14 can be smoothly displaced along the sliding surface 77 of the bearing 24d, which is supported between the slider 14 and the guide section 42b.

Further, as shown in FIG. 10, the bearing 24d has a distance L5 between the inner wall surface of one flange section 76a and the outer wall surface of the other flange section 76b, which is larger than the distance L6 between the inner wall surface of one deep groove 170a of the second bearing support member 154 and the outer wall surface of the other deep groove 170b (L5>L6). Therefore, the bearing 24d can be displaced slightly in the axial direction (direction of arrows A, B) within the retaining groove 168.

As a result, when the flange sections 76a, 76b of the bearing 24d abut against the slider 14 upon displacement of the slider 14, outer wall surfaces of the flange sections 76a, 76b abut against the outer wall surfaces of the deep grooves 72a, 72b.

Projections 78, which protrude respectively toward the end blocks 16a, 16b, are formed on the end surfaces of the flange sections 76a, 76b. When the flange sections 76a, 76b engage within the deep grooves 170a, 170b, the projections 78 engage within the recesses 80c that are formed on the end surfaces of the second bearing support member 154. Therefore, the bearing 24d installed in the retaining groove 168 can be prevented from disengagement from the second bearing support member 154.

As shown in FIGS. 5 and 10, the plate-shaped second elastic member 158, which has a substantially rectangular shape, is interposed between the second bearing support member 154 and the inner wall surface of the installation groove 160b.

The second elastic member 158 is formed of, for example, a hard rubber material. A slit hole 172 having a predetermined length extending in the longitudinal direction is formed at a substantially central portion of the second elastic member 158. The slit hole 172 engages with a convex engaging projection 174, which is formed on the side surface of the second bearing support member 154. Accordingly, relative displacement of the second elastic member 158 is regulated with respect to the second bearing support member 154.

As described above, the second elastic member 158 is disposed between the second bearing support member 154 and the slider 14. Accordingly, the second bearing support member 154 is pressed toward the guide section 42b by means of the resilient force of the second elastic member 158.

In the cylinder apparatus 10 having the bearing support mechanism as described above, bearings 24c, 24d are provided for the first and second bearing support members 88, 154 that are installed respectively on the slider 14. The bearings 24c, 24d abut against the guide sections 42a, 42b of the cylinder tube 12. In this arrangement, the slider 14 is installed on the cylinder tube 12 at an upper position, and then the first and second bearing support members 88, 154, which constitute the guide mechanism 28, are assembled onto the slider 14.

However, the present invention need not be limited in this manner. Retaining grooves may be formed in the retaining sections 68a, 68b of the slider 14, in order to directly install the bearings 24c, 24d therein. Accordingly, it is possible to reduce the number of parts of the guide mechanism 28. The slider 14 and guide mechanism 28 can be assembled so that the slider 14 slides from ends of the cylinder tube 12 in the axial direction.

The cylinder apparatus 10, which forms an example of an actuator to which the bearing support mechanism according to the first embodiment of the present invention is applied, is basically constructed as described above. Next, operations, functions, and effects thereof will be explained. Explanations shall be given assuming that an initial position resides in a state in which the slider 14 and pistons 44a, 44b are displaced toward one end block 16a (in the direction of arrow B).

At first, in the initial position, a pressure fluid (for example, compressed air) is supplied to the first port 110 of the end block 16a. Accordingly, the pressure fluid is introduced into one cylinder chamber 114a of the cylinder tube 12 via the unillustrated passage of the end block 16a. The piston 44a is pressed toward the other end block 16b (in the direction of arrow A) under a pressing action effected by the pressure fluid. The slider 14 is displaced in the axial direction while being guided by the guide sections 42a, 42b integrally with the piston 44a, through operation of the piston yoke 54 and the coupler 62. In this situation, the second port 112 is open to atmospheric air.

Figure 11A:
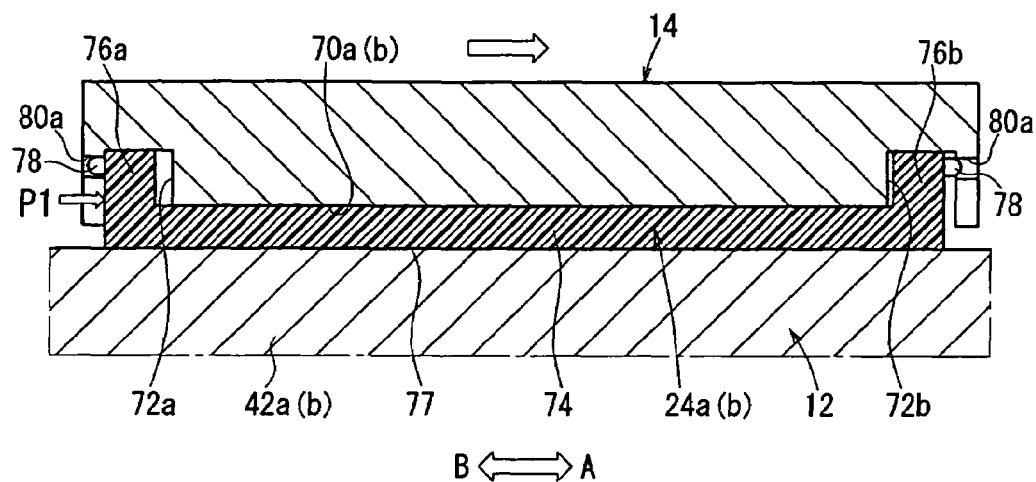
FIGS. 11A and 11B are schematic views of a relative displacement operation in relation to the slider and the bearing supported by the slider, when the slider is displaced in the axial direction.

In this operation, as shown in FIG. 11A, with respect the bearings 24a to 24d, the inner wall surfaces of the deep grooves 72a, 164a, 170a disposed on the side of one end block 16a abut against one flange section 76a when the slider 14 is displaced. The flange section 76a is pressed in the direction of arrow A by the inner wall surfaces of the deep grooves 72a, 164a, 170a.

Accordingly, the bearings 24a to 24d overcome the sliding resistance generated between the sliding surface 77 of the bearings 24a to 24d and the guide sections 42a, 42b of the cylinder tube 12, so as to be displaced together with the slider 14 in an integrated manner. In this situation, a non-contact state is given, in which a clearance with a predetermined spacing is provided in the axial direction, between the slider 14 and the other flange section 76b of the bearings 24a to 24d.

More specifically, when the slider 14 is displaced from its initial position toward the other end block 16b, a pressing force P1, which is exerted in the axial direction from the slider 14 during displacement of the slider 14, is applied to only one flange section 76a of the bearings 24a to 24d.

During this operation, as shown in FIG. 2, the upper belt 18 and the lower belt 20 disposed on the right side of the slider 14, which have been closed by means of the lower belt guide section 146 and the belt-holding section 132 of the guide member 128b, are opened by the belt separator section 130, in accordance with displacement of the slider 14.

Conversely, the upper belt 18 and the lower belt 20 disposed in the vicinity of the central portion of the slider 14, which have been opened by the belt separator section 130 of the guide member 128a, are closed by the lower belt guide section 146 and the belt-holding section 132 of the belt guide mechanism 22, in accordance with displacement of the slider 14. As described above, the slider 14 is displaced in the axial direction (direction of arrow A) along the cylinder tube 12, in a state in which the slit 32 is sealed and the bore section 30 is closed, by means of the upper belt 18 and the lower belt 20.

The slider 14 is further displaced toward the other end block 16b (in the direction of arrow A), whereupon the shaft section 50 provided at the end of the piston 44b is inserted into the insertion hole 124 of the cylindrical member 122. Accordingly, fluid that flows between the shaft section 50 and the insertion hole 124 is blocked by the check packing 126 of the insertion hole 124, so that the fluid flows through only the unillustrated bypass passage. Therefore, displacement is effected while lowering the displacement speed of the pistons 44a, 44b. The end surface of the piston 44b abuts against the end surface of the cylindrical member 122, thereby arriving at its displacement terminal end position.

Subsequently, when an unillustrated directional control valve is switched to supply pressure fluid to the second port 112, the pressure fluid is introduced into the other cylinder chamber 114b of the cylinder tube 12, via the unillustrated passage of the end block 16b. The piston 44b is pressed toward one end block 16a (in the direction of arrow B) under a pressing action effected by the pressure fluid. The slider 14 is displaced in the axial direction (direction of arrow B) along the guide sections 42a, 42b of the cylinder tube 12 together with the piston 44b.

Figure 11B:
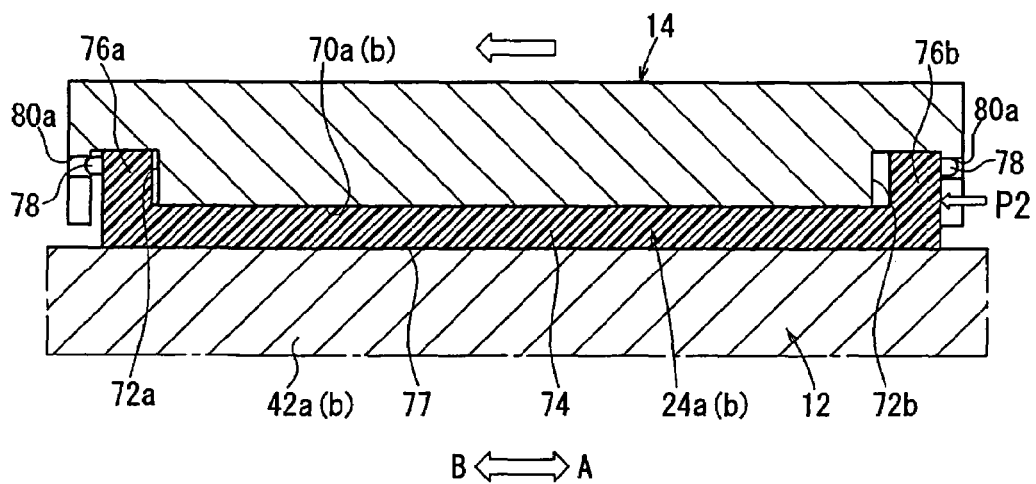

In this situation, as shown in FIG. 11B, with respect to the bearings 24a to 24d installed in the bearing-retaining section 26, the inner wall surface of the deep grooves 72b, 164b, 170b disposed on the side of the other end block 16b abuts against the other flange section 76b upon displacement of the slider 14. The flange section 76b is pressed in the direction of arrow B by the inner wall surface of the deep grooves 72b, 164b, 170b. Accordingly, the bearings 24a to 24d overcome the sliding resistance generated between the sliding surfaces 77 of the bearings 24a to 24d and the guide sections 42a, 42b of the cylinder tube 12, and the bearings 24a to 24d are displaced together with the slider 14 in an integrated manner in the direction of arrow B. In this situation, a clearance with a predetermined spacing in the axial direction is formed between one flange section 76a and the inner wall surface of one deep groove 72a, 164a, 170a, and a non-contact state is provided between the flange section 76a and the slider 14.

More specifically, when the slider 14 is displaced from the displacement terminal end position toward one end block 16a, the pressing force P2, which is exerted in the axial direction from the slider 14 in accordance with displacement of the slider 14, is applied to only the other flange section 76b of the bearings 24a to 24d.

In this situation, as shown in FIG. 2, the upper belt 18 and the lower belt 20, which have been closed by the lower belt guide section 146 and the belt-holding section 132 of the guide member 128a, are opened by the belt separator section 130 of the guide member 128a, reversely to the situation in which the slider 14 is displaced toward the other end block 16b. The upper belt 18 and the lower belt 20, which have been opened by the belt separator section 130 of the guide member 128b, are closed by the belt-holding section 132 and the lower belt guide section 146.

The slider 14 is further displaced toward one end block 16a (in the direction of arrow B), whereupon the shaft section 50 provided on the piston 44a is inserted into the insertion hole 124 of the cylindrical member 122. Accordingly, the displacement speed of the pistons 44a, 44b is lowered, and then the end surface of the piston 44a abuts against the end surface of the cylindrical member 122. Accordingly, the displacement is stopped and the slider 14 is restored to its initial position.

As described above, in the first embodiment, the plurality of bearings 24a to 24d are disposed substantially in parallel at the bearing-retaining section 26, to serve as sliding portions between the slider 14 and the guide sections 42a, 42b of the cylinder tube 12. The distance L1 (L3, L5) in the axial direction between one flange section 76a and the other flange section 76b of the bearings 24a to 24d is larger than the distance L2 (L4, L6) in the axial direction between one deep groove 72a, 164a, 170a and the other deep groove 72b, 164b, 170b. A clearance of a predetermined spacing is provided between the flange sections 76a, 76b and the deep grooves 72a, 72b, 164a, 164b, 170a, 170b. The bearings 24a to 24d are displaceable in the axial direction within the retaining grooves 70a, 70b, 162, 168.

Accordingly, when the slider 14 is displaced along the guide sections 42a, 42b of the cylinder tube 12, a pressing force is applied from the deep grooves 72a, 72b, 164a, 164b, 170a, 170b of the slider 14 to only one of the flange sections 76a, 76b of the bearings 24a to 24d, depending on the displacement direction of the slider 14. In other words, a pressing force is applied from the slider 14 to the flange section, which is always directed toward the backward side with respect to the displacement direction of the slider 14.

Therefore, the pressing force applied from the slider 14 to the bearings 24a to 24d is dispersed over one flange section 76a and the other flange section 76a respectively. Accordingly, tensile stresses are not generated in the bearings 24a to 24d, and compressive stresses can be consistently generated. In other words, alternating loads are not applied to the bearings 24a to 24d when the slider 14 is displaced. As a result, the durability of the bearings 24a to 24d can be improved.

When the slider 14 is displaced along the guide sections 42a, 42b of the cylinder tube 12, pressing forces P1 to P4 exerted by the slider 14 are applied to the bearings 24a to 24d in the displacement direction of the slider 14. On the other hand, a resistance force, which acts as a sliding resistance, is applied in a direction opposite to the displacement direction of the slider 14 to the sliding surfaces 77 of the bearings 24a to 24d, which make sliding contact with the guide sections 42a, 42b.

In this situation, in the case of the conventional technique, when the displacement member is displaced along the guide rail, tensile stress is generated consequently in the axial direction with respect to the slide member, while a pressing force exerted from the displacement member is applied in a direction causing separation from the sliding surface between the displacement member and the slide member, because a projection is provided on only one end side of the slide member.

By contrast, in the case of the bearing support structure according to the first embodiment, as shown in FIGS. 11A and 11B, flange sections 76a, 76b are provided at both ends of the bearings 24a to 24d. In this arrangement, the pressing force exerted from the slider 14 is continuously applied toward the sliding surface 77 by the aid of the flange sections 76a, 76b, while sliding resistance is applied to the bearings 24a to 24d from the sliding surface 77. Therefore, pressing forces P1 to P4 exerted from the slider 14, and the resistance force applied to the bearings 24a to 24d from the sliding surface 77, act in directions that make tight contact with each other. Therefore, tensile stresses are not generated in the bearings 24a to 24d, and thus durability of the bearings 24a to 24d can be improved.

Figure 12:
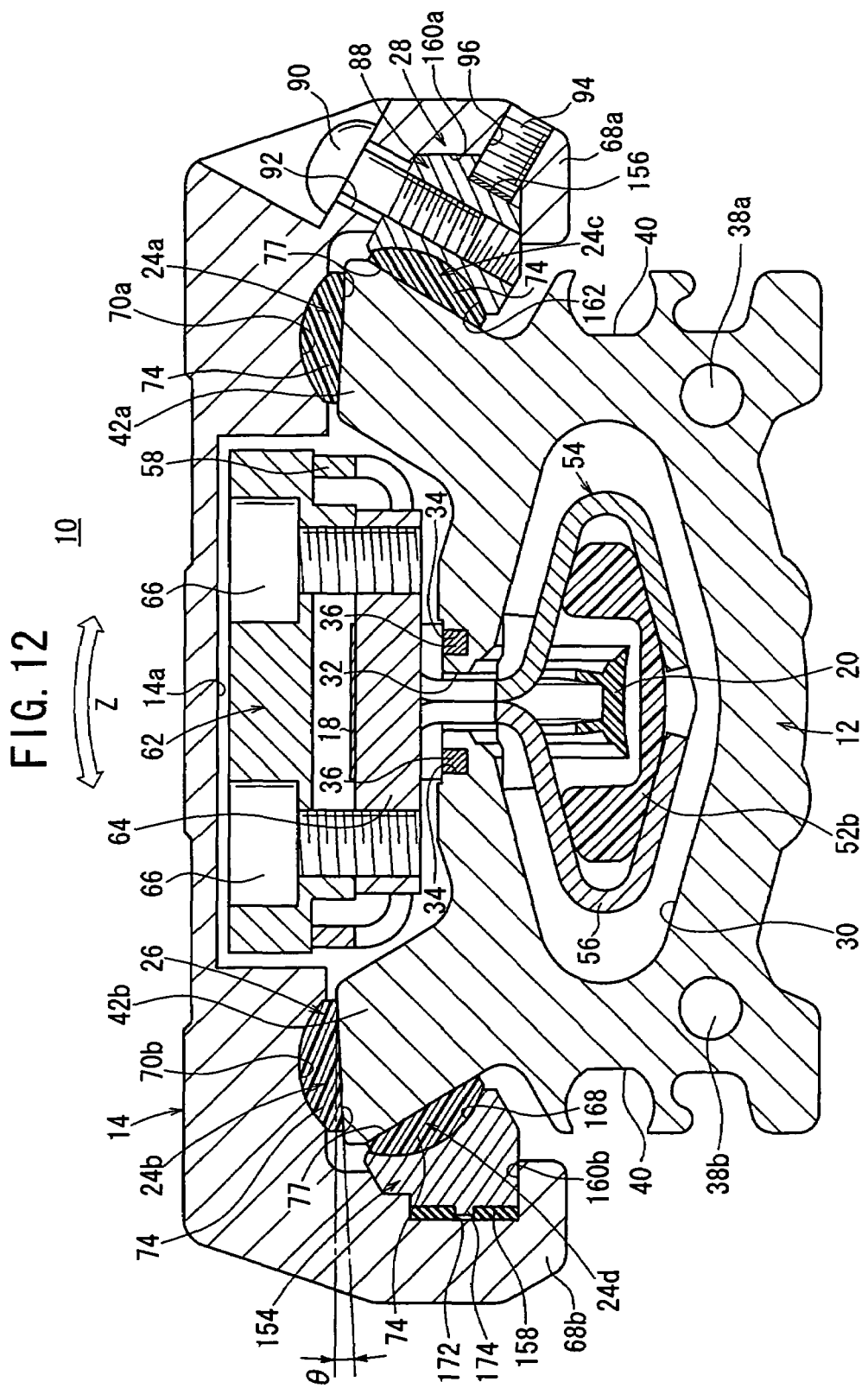
FIG. 12 is a vertical sectional view illustrating the cylinder apparatus, depicting a situation in which guide sections of a cylinder tube shown in FIG. 7 are deformed in directions to separate from each other, and wherein upper surfaces of the guide sections are inclined by a predetermined angle.

For example, the slider 14 may become inclined by a predetermined angle with respect to the cylinder tube 12, due to a workpiece or the like being placed on the slider 14 in some cases, and/or upper surfaces of the pair of guide sections 42a, 42b may become inclined by a predetermined angle θ in other cases, because the bore section 30 is opened via the slit 32 of the cylinder tube 12, as shown in FIG. 12. In such situations, it is feared that unbalanced loads could be applied on the bearings 24*a* to 24*d* that are disposed between the slider 14 and the guide sections 42*a*, 42*b*.

However, even in such situations, in the bearing support structure according to the first embodiment, the main body section 74 of the bearings 24*a* to 24*d* has a cross-sectional shape, which is formed with a substantially circular arc-shaped cross section expanded toward the retaining grooves 70*a*, 70*b*, 162, 168 in which the bearings 24*a* to 24*d* are installed. Further, the shape of each of the retaining grooves 70*a*, 70*b*, 162, 168 is recessed with substantially the same circular arc-shaped cross section, corresponding to the shape of the main body section 74. Therefore, even when unbalanced loads are applied to the bearings 24*a* to 24*d*, the slider 14 can undergo a swinging displacement (in the direction of arrow Z as shown in FIGS. 7 and 12) by displacing the retaining grooves 70*a*, 70*b*, 162, 168 in the circumferential direction along the upper surfaces of the bearings 24*a* to 24*d*, which are expanded with a substantially circular arc-shaped cross section.

As a result, unbalanced loads, which are applied to the bearings 24*a* to 24*d* from the guide sections 42*a*, 42*b* of the cylinder tube 12 and the slider 14, can be appropriately absorbed between the bearings 24*a* to 24*d* and the retaining grooves 70*a*, 70*b*, 162, 168. It is also possible to avoid unbalanced abrasion of the bearings 24*a* to 24*d*. Simultaneously, the slider 14 can be maintained substantially horizontal with respect to the cylinder tube 12.

Figure 13:
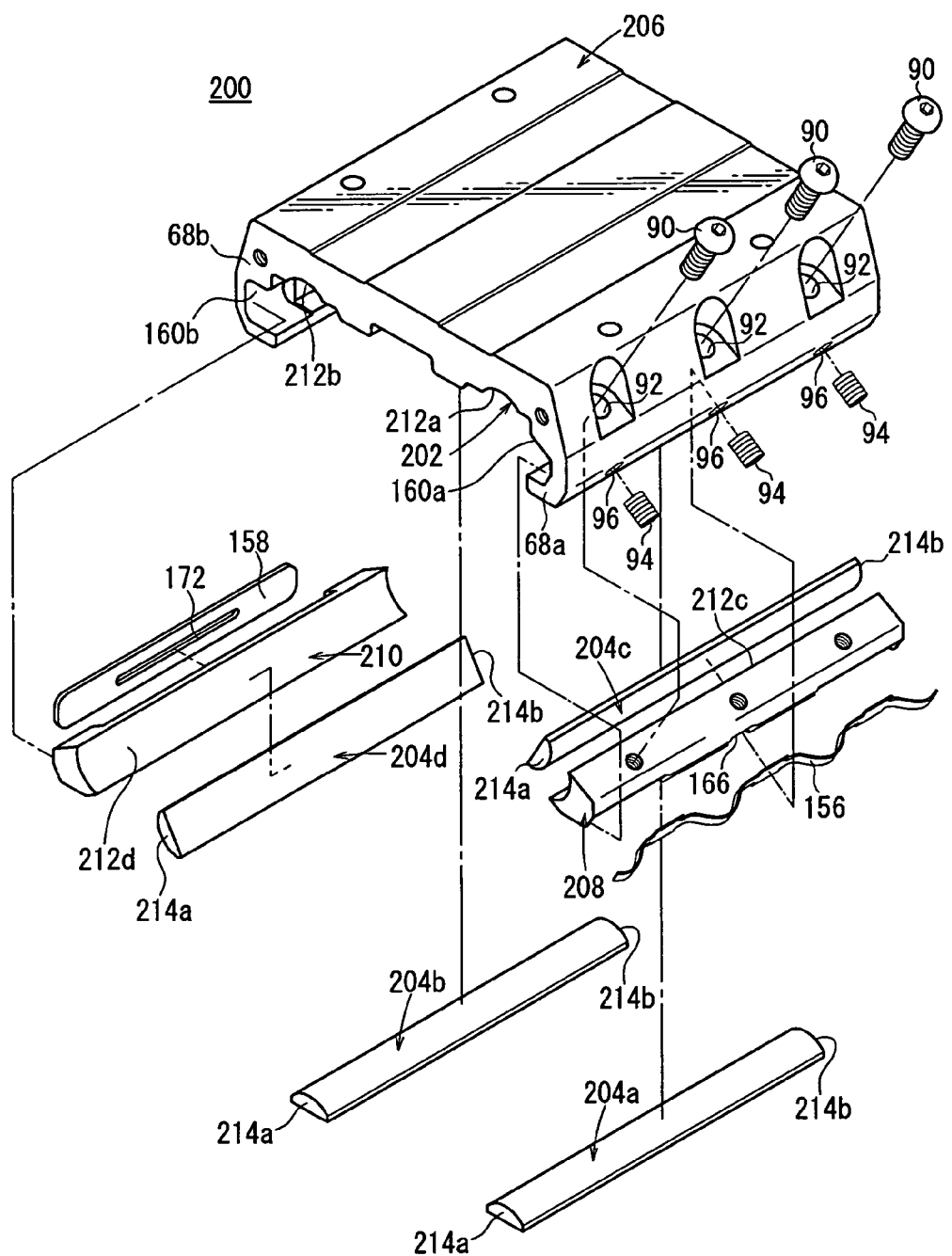
FIG. 13 is an exploded perspective view illustrating a guide mechanism of a cylinder apparatus to which a bearing support structure according to a second embodiment of the present invention is applied.
Figure 14:
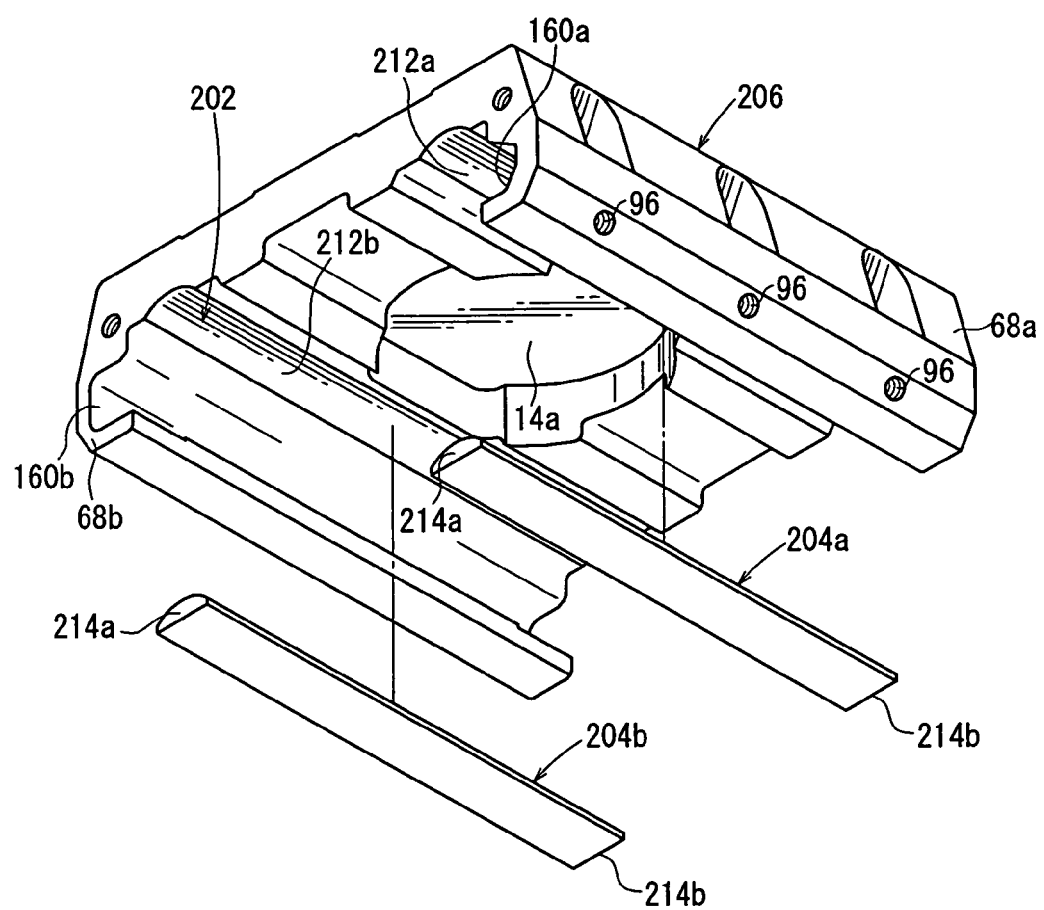
FIG. 14 is an exploded perspective view illustrating a slider of the cylinder apparatus shown in FIG. 13 as viewed from a lower position.

Next, FIGS. 13 to 15 show a cylinder apparatus 200, as an example of an actuator to which a bearing support structure according to a second embodiment is applied. The same constitutive components as those of the cylinder apparatus 10 having the bearing support structure according to the first embodiment described above are designated using the same reference numerals, and detailed explanation of such features shall be omitted.

In the case of the cylinder apparatus 200, bearings 204*a* to 204*d*, which are installed in a bearing-retaining section 202, are formed with substantially identical cross-sectional shapes in the axial direction, without having flange sections at both ends of the bearings 204*a* to 204*d*. The cylinder apparatus 200 is different from the cylinder apparatus 10 having the bearing support structure according to the first embodiment, in that a lower surface of a slider 206, a first bearing support member 208, and retaining grooves 212*a* to 212*d* of a second bearing support member 210, are formed corresponding to shapes of the bearings 204*a* to 204*d*. Unlike the first embodiment, a pair of deep grooves is not formed in the retaining grooves 212*a* to 212*d*.

Two retaining grooves 212*a*, 212*b* are formed in the axial direction, penetrating through both end surfaces of the slider 206, wherein the retaining grooves 212*a*, 212*b* are recessed with substantially circular arc-shaped cross sections.

Similarly, the retaining groove 212*c* formed in the first bearing support member 208 and the retaining groove 212*d* formed in the second bearing support member 210 penetrate from one end surface to the other end surface as well, and are recessed with substantially circular arc-shaped cross sections.

Figure 15A:
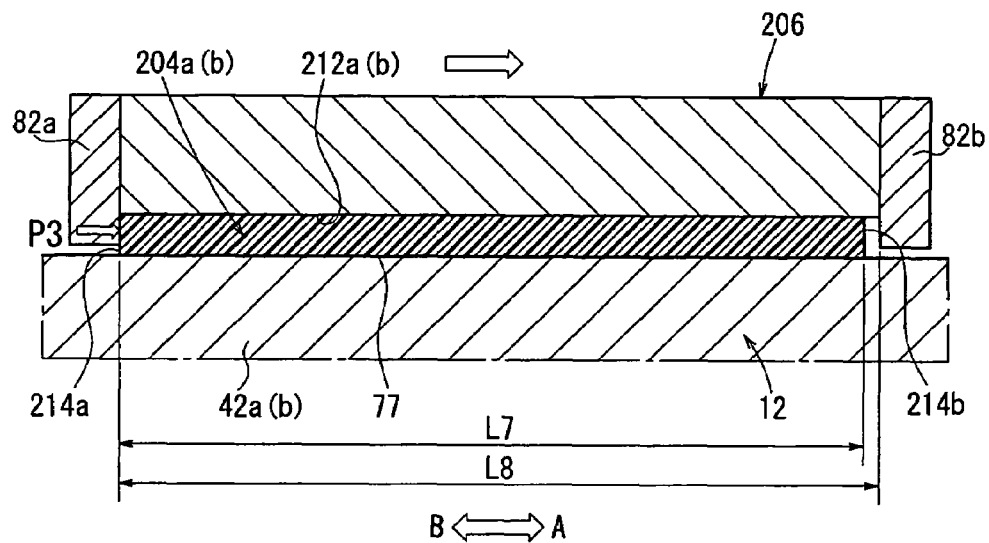
FIGS. 15A and 15B are schematic views of a relative displacement operation, in relation to the slider and the bearing supported by the slider, when the slider is displaced in the axial direction, in the cylinder apparatus according to the second embodiment.

As shown in FIGS. 13 and 14, the bearings 204*a* to 204*d* are formed corresponding to the shapes of the retaining grooves 212*a* to 212*d*. Side surfaces thereof, which abut against the retaining grooves 212*a* to 212*d*, are expanded to provide substantially circular arc-shaped cross sections. As shown in FIG. 15A, the length dimension L7 in the axial direction of the bearings 204*a* to 204*d*, is slightly smaller than the length dimension L8 in the axial direction of the retaining grooves 212*a* to 212*d* (L7<L8). In this state, the bearings 204*a* to 204*d* are displaceable by a slight amount (L8–L7) in the axial direction within the retaining grooves 212*a* to 212*d*. The cross-sectional shape of the bearings 204*a* to 204*d* is not limited solely to a substantially circular arc-shaped configuration, but may also be of a substantially rectangular shape.

After the bearings 204*a* to 204*d* have been installed in the retaining grooves 212*a*, 212*b* of the slider 206, which is assembled onto the cylinder tube 12, and into the retaining grooves 212*c*, 212*d* of the first and second bearing support members 208, 210 respectively, the cover members 82*a*, 82*b* are installed and fixed to both end surfaces of the slider 206. Accordingly, ends of the retaining grooves 212*a* to 212*d* are closed by the cover members 82*a*, 82*b*. Therefore, the bearings 204*a* to 204*d* are prevented from becoming disengaged from the slider 206 and the first and second bearing support members 208, 210 in the axial direction. The cover members 82*a*, 82*b* preferably are formed of a metal material.

More specifically, a slight clearance is provided between one end surface 214*a* or the other end surface 214*b* of the bearings 204*a* to 204*d* and inner wall surfaces of the cover members 82*a*, 82*b*.

Figure 15B:
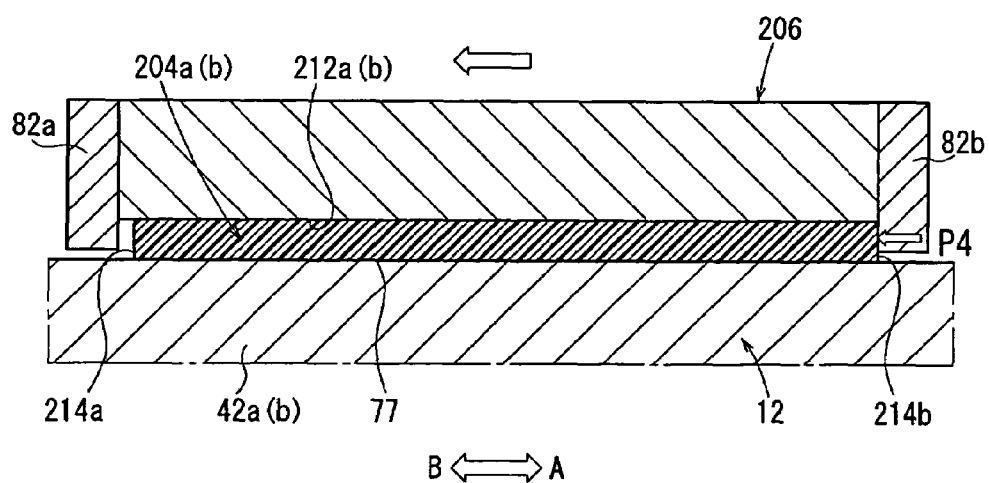

Next, an explanation shall be made concerning operation of the bearings 204*a*, 204*b* when the slider 206 is displaced in the axial direction, as shown in FIGS. 15A and 15B, wherein an explanation shall be made concerning operation of the bearings 204*a*, 204*b* installed within the retaining grooves 212*a*, 212*b* of the slider 206. Operation of the bearings 204*c*, 204*d* installed in the retaining grooves 212*c*, 212*d* of the first and second bearing support members 208, 210 is the same as that of the bearings 204*a*, 204*b*, and therefore detailed explanation of bearings 204*c*, 204*d* shall be omitted.

At first, as shown in FIG. 15A, when the slider 206 is displaced in the direction of arrow A along the cylinder tube 12 upon supply of the pressure fluid (for example, compressed air), the inner wall surface of one cover member 82*a* abuts against the bearings 204*a*, 204*b* installed in the retaining grooves 212*a*, 212*b* of the slider 206, and the bearings 204*a*, 204*b* are pressed in the direction of arrow A by the cover member 82*a*, which abuts against one end surface 214*a* of the bearings 204*a*, 204*b*. During this situation, the other end surface 214*b* of the bearings 204*a*, 204*b* and the other cover member 82*b* are not in contact with each other.

That is, when the slider 206 is displaced in the direction of arrow A, a pressing force P3, which is exerted in the axial direction from the slider 206 as the slider 206 is displaced, is applied to only one end surface 214*a* of the bearings 204*a*, 204*b*.

Subsequently, as shown in FIG. 15B, when an unillustrated directional control valve is switched and the slider 206 is displaced by the pressure fluid in the direction of arrow B, opposite to the situation discussed above, the inner wall surface of the other cover member 82*b* abuts against the bearings 204*a*, 204*b* installed in the bearing-retaining section 202, and the bearings 204*a*, 204*b* are pressed in the direction of arrow B by the cover member 82*b*, which abuts against the other end surface 214*b* of the bearings 204*a*, 204*b*. In this situation, the end surface 214*a* of the bearings 204*a*, 204*b* and the cover member 82*a* are not in contact with each other.

That is, when the slider 206 is displaced in the direction of arrow B, a pressing force P4, which is exerted in the axial direction from the slider 206 as the slider 206 is displaced, is applied only to the other end surface 214*b* of the bearings 204*a*, 204*b*.

As described above, when the bearings 204*a* to 204*d* are installed respectively into the retaining grooves 212*a* to 212*d*, slight clearances are provided between the inner wall surface of the cover members 82*a*, 82*b* and both end surfaces 214*a*, 214*b* of the bearings 204*a* to 204*d*. Therefore, the bearings 204*a* to 204*d* are displaceable by slight amounts within the retaining grooves 212*a* to 212*d*. Accordingly, when the slider 206 is displaced in the axial direction while being guided by the cylinder tube 12, only one of both end surfaces of the bearings 204*a* to 204*d* is pressed by the cover members 82*a*, 82*b* attached to the slider 206, and the bearings 204*a* to 204*d* are displaced in the axial direction together with the slider 206.

As a result, the pressing forces P3, P4 applied from the slider 206 to the bearings 204*a* to 204*d* can be dispersed respectively over one end surface 214*a* and the other end surface 214*b* of the bearings 204*a* to 204*d*, depending on the displacement direction of the slider 206. Thus, it is possible to suppress concentration of load on the bearings 204*a* to 204*d*, thereby improving durability of the bearings 204*a* to 204*d*.

It is unnecessary to form flange sections at both ends of the bearings 204*a* to 204*d* respectively, and it is also unnecessary to form deep grooves in the slider 206 in order to engage the flange sections, as compared with the cylinder apparatus 10 having the bearing support structure according to the first embodiment. Therefore, the production cost of the cylinder apparatus 200 can be reduced.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A bearing support structure for an actuator, for supporting a bearing at a sliding portion between a displacement member displaceable in an axial direction of a main actuator body and a guide section of said main actuator body, said bearing support structure comprising:
a bearing having a sliding surface that abuts against said guide section; and
a bearing support section provided on said displacement member, said bearing support section retaining said bearing between said bearing support section and said guide section, both end surfaces of said bearing being disposed in said axial direction of said bearing, only one of said end surfaces abutting against said displacement member when said displacement member is displaced, wherein said one end surface of said bearing is pressed by said bearing support section during a state in which said bearing abuts against said guide section and said bearing is displaced integrally with said displacement member, when said displacement member is displaced in said axial direction along said guide section.

2. The bearing support structure according to claim 1, wherein a pair of engaging projections, which are substantially perpendicular to the axial direction of said bearing, are formed at both ends of said bearing in said axial direction, and said engaging projections are engaged displaceably in said axial direction with respect to said displacement member.

3. The bearing support structure according to claim 2, wherein recesses are formed in said displacement member, into which said engaging projections of said bearing are inserted.

4. The bearing support structure according to claim 1, wherein said bearing, which is installed to said displacement member, has a side surface formed with a substantially circular arc-shaped cross section in relation to said bearing support section, and a first retaining section is formed in said displacement member, defining a recess therein with a substantially identical cross section corresponding to the arc-shaped cross section of said bearing.

5. The bearing support structure according to claim 4, wherein said bearing is displaceable in a circumferential direction along an inner circumferential surface of said first retaining section.

6. The bearing support structure according to claim 4, wherein said bearing support section includes a bearing support member for retaining said bearing, said bearing support member being disposed in said displacement member, wherein said bearing abuts against a side surface of said guide section through said bearing support member.

7. The bearing support structure according to claim 6, wherein said bearing support member includes a second retaining section for retaining said bearing, and having a recess with a substantially circular arc-shaped cross section, said first retaining section and said second retaining section surrounding said guide section.

8. The bearing support structure according to claim 7, wherein said second retaining section is arranged on a circle having the same circumference, radius and center as an identical circle on which said first retaining section is arranged, with said guide section intervening therebetween.

9. The bearing support structure according to claim 8, wherein said bearing support member includes a first elastic member disposed between said bearing support member and said displacement member, for urging said bearing support member toward said guide section.

10. The bearing support structure according to claim 9, wherein said first elastic member comprises a plate spring.

11. The bearing support structure according to claim 8, wherein said bearing support member comprises a second elastic member disposed between said bearing support member and said displacement member for urging said bearing support member toward said guide section.

12. The bearing support structure according to claim 11, wherein said second elastic member comprises a hard rubber material.

13. The bearing support structure according to claim 7, wherein a longitudinal dimension of said bearing is smaller than a longitudinal dimension of said second retaining section of said bearing support member.

14. The bearing support structure according to claim 4, wherein a longitudinal dimension of said bearing is smaller than a longitudinal dimension of said first retaining section of said displacement member.

* * * * *